(12) United States Patent
Amengual Galdon et al.

(10) Patent No.: US 10,979,663 B2
(45) Date of Patent: Apr. 13, 2021

(54) METHODS AND APPARATUSES FOR IMAGE PROCESSING TO OPTIMIZE IMAGE RESOLUTION AND FOR OPTIMIZING VIDEO STREAMING BANDWIDTH FOR VR VIDEOS

(71) Applicant: YERBA BUENA VR, INC., Campbell, CA (US)

(72) Inventors: Sebastian Amengual Galdon, San Jose, CA (US); Victor Ernesto Garcia Sanchez, Sunnyvale, CA (US)

(73) Assignee: YERBA BUENA VR, INC., San Jose, CA (US)

( * ) Notice: Subject to any disclaimer, the term of this patent is extended or adjusted under 35 U.S.C. 154(b) by 35 days.

(21) Appl. No.: 15/935,381

(22) Filed: Mar. 26, 2018

(65) Prior Publication Data

US 2018/0288363 A1    Oct. 4, 2018

Related U.S. Application Data

(60) Provisional application No. 62/478,780, filed on Mar. 30, 2017.

(51) Int. Cl.
*H04N 5/917* (2006.01)
*H04N 19/146* (2014.01)
(Continued)

(52) U.S. Cl.
CPC ............... *H04N 5/917* (2013.01); *H04N 5/76* (2013.01); *H04N 19/146* (2014.11); *H04N 19/40* (2014.11); *H04N 19/46* (2014.11); *H04N 19/597* (2014.11); *G06T 19/006* (2013.01); *G06T 2207/10021* (2013.01)

(58) Field of Classification Search
CPC ........ H04N 5/917; H04N 5/76; H04N 19/146; H04N 19/46; H04N 19/597; H04N 19/40
See application file for complete search history.

(56) References Cited

U.S. PATENT DOCUMENTS 9,392,212 B1 *  7/2016  Ross ................... G11B 27/005
9,473,758 B1    10/2016  Long et al.
(Continued)

FOREIGN PATENT DOCUMENTS

EP    2894852 A1    7/2015
WO    2016191694 A1    12/2016
(Continued)

OTHER PUBLICATIONS

El-Ganainy, et al. "Streaming Virtual Reality Content" Dec. 26, 2016, available from arxiv.org.
(Continued)

*Primary Examiner* — David E Harvey
(74) *Attorney, Agent, or Firm* — Buchalter; Cecily Anne O'Regan

(57) ABSTRACT

The disclosure relates to optimizing and improving VR video resolution and bandwidth usage for VR videos. The processes and systems include receiving a video input and reassigning pixels within a viewport to maximize resolution around the center of the viewport. The process can include video frame stamping to provide a mechanism for a client-side player to determine characteristics of an optimized video frame display.

23 Claims, 24 Drawing Sheets

(51) Int. Cl.
  *H04N 19/46*  (2014.01)
  *H04N 5/76*  (2006.01)
  *H04N 19/597*  (2014.01)
  *H04N 19/40*  (2014.01)
  *G06T 19/00*  (2011.01)

(56) References Cited

U.S. PATENT DOCUMENTS

| | | | |
|---|---|---|---|
| 9,681,111 B1* | 6/2017 | Newman | G11B 27/3027 |
| 9,922,387 B1* | 3/2018 | Newman | G06F 16/5866 |
| 2013/0294513 A1* | 11/2013 | Seregin | H04N 19/513 |
| | | | 375/240.14 |
| 2015/0178953 A1* | 6/2015 | Gao | G06T 7/70 |
| | | | 345/681 |
| 2015/0341552 A1* | 11/2015 | Chen | G06T 17/00 |
| | | | 348/38 |
| 2015/0346812 A1* | 12/2015 | Cole | G06F 3/017 |
| | | | 345/156 |
| 2016/0012855 A1 | 1/2016 | Krishnan | |
| 2016/0065946 A1* | 3/2016 | Cole | H04N 13/398 |
| | | | 348/43 |
| 2016/0142697 A1* | 5/2016 | Budagavi | H04N 13/156 |
| | | | 348/43 |
| 2016/0150212 A1* | 5/2016 | Moura | H04N 19/39 |
| | | | 375/240.02 |
| 2016/0165309 A1 | 6/2016 | Brandenburg et al. | |
| 2016/0219241 A1 | 7/2016 | Korneliussen et al. | |
| 2016/0241837 A1* | 8/2016 | Cole | G06T 17/20 |
| 2016/0260196 A1 | 9/2016 | Roimela et al. | |
| 2016/0277772 A1* | 9/2016 | Campbell | H04N 21/47 |
| 2016/0330430 A1* | 11/2016 | Jin | H04N 13/246 |
| 2016/0352791 A1* | 12/2016 | Adams | H04L 65/4069 |
| 2016/0353146 A1* | 12/2016 | Weaver | H04N 21/2662 |
| 2016/0381398 A1 | 12/2016 | Saxena et al. | |
| 2017/0039881 A1 | 2/2017 | Belch et al. | |
| 2017/0078447 A1* | 3/2017 | Hancock | G06F 3/013 |
| 2017/0200255 A1* | 7/2017 | Lin | G06T 7/90 |
| 2017/0251208 A1* | 8/2017 | Adsumilli | H04N 19/597 |
| 2017/0274411 A1* | 9/2017 | Carroll | B05C 11/021 |
| 2017/0280126 A1* | 9/2017 | Van der Auwera | |
| | | | G06T 3/0056 |
| 2017/0295356 A1* | 10/2017 | Abbas | H04N 13/161 |
| 2017/0336705 A1* | 11/2017 | Zhou | H04N 19/85 |
| 2017/0366808 A1* | 12/2017 | Lin | H04N 5/2258 |
| 2017/0374375 A1* | 12/2017 | Makar | H04N 19/597 |
| 2017/0374411 A1* | 12/2017 | Lederer | H04N 21/8456 |
| 2018/0007422 A1* | 1/2018 | Castleman | H04N 13/378 |
| 2018/0027257 A1* | 1/2018 | Izumi | G06T 9/00 |
| | | | 386/328 |
| 2018/0063505 A1* | 3/2018 | Lee | G06T 3/0018 |
| 2018/0063512 A1* | 3/2018 | Hong | H04N 13/261 |
| 2018/0098090 A1* | 4/2018 | Lin | H04N 19/174 |
| 2018/0103199 A1* | 4/2018 | Hendry | H04N 21/2343 |
| 2018/0146193 A1* | 5/2018 | Safreed | H04N 19/167 |
| 2018/0164593 A1* | 6/2018 | Van Der Auwera | |
| | | | H04N 21/816 |
| 2018/0167613 A1* | 6/2018 | Hannuksela | H04N 19/115 |
| 2018/0199029 A1* | 7/2018 | Van Der Auwera | |
| | | | H04N 13/111 |
| 2018/0242017 A1* | 8/2018 | Van Leuven | H04N 19/172 |
| 2018/0286109 A1* | 10/2018 | Woo | G06F 3/011 |
| 2018/0374192 A1* | 12/2018 | Kunkel | G06T 15/205 |
| 2019/0005709 A1* | 1/2019 | Kim | H04N 19/117 |
| 2019/0158813 A1* | 5/2019 | Rowell | H04N 13/189 |
| 2019/0166382 A1* | 5/2019 | He | H04N 19/186 |
| 2019/0191170 A1* | 6/2019 | Zhao | H04N 19/563 |
| 2019/0199995 A1* | 6/2019 | Yip | G06T 3/00 |
| 2019/0213975 A1* | 7/2019 | Nakata | G09G 5/36 |
| 2019/0236990 A1* | 8/2019 | Song | G06T 3/0062 |
| 2019/0238861 A1* | 8/2019 | D'Acunto | H04N 21/26258 |
| 2019/0342563 A1* | 11/2019 | Nakagami | H04N 19/167 |
| 2019/0373245 A1* | 12/2019 | Lee | H04N 21/234345 |
| 2020/0112710 A1* | 4/2020 | Oh | H04N 13/194 |

FOREIGN PATENT DOCUMENTS

WO  2017205648 A1  11/2017
WO  2018183257 A1  10/2018

OTHER PUBLICATIONS

Hosseini, et al. "Adaptive 360 VR Video Streaming: Divide and Conquer!" Jan. 23, 2017, available from arXiv.org.
Kingdom, et al. "Binocular Vision: The Eyes Add and Substract" Current Biology vol. 22(1), Jan. 10, 2012 pp. R22-R24.
Pixvana, "An intro to FOVAS: Field of View Adaptive Streaming for Virtual Reality," Jun. 16, 2016.
Mavlankar et al. "An Interactive Region-of-Interest Video Streaming System for Online Lecture Viewing" Proc. 2010 18th International Packet Video Workshop, pp. 64-71 (2010).
Mavlankar et al. "Peer-to-Peer Multicast Live Video Streaming with Interactive Virtual Pan/Tilt/Zoom Functionality" 15th IEEE Int'l Conf. on Image Processing, pp. 2296-2299 (2008).

* cited by examiner

```
{
"SegmentLength": "1000",
"fps": "60",
"gop": "10",
"codec": "x264",
"periods": [
  {
    "viewports": [
      {"yaw":"90","pitch":"0","roll":"0","faceId":"0","representations": [
        {"geometry":"cm","transformParams":"d=640","targetResolution":"2160:2160","warpType":"1","bitrate":"20000","encParams":"crf=25","codec":"x265"},
        {"geometry":"pm","transformParams":"d=480","targetResolution":"1920:1080","warpType":"2","bitrate":"10000","encParams":"crf=27","codec":"x265"},
        {"geometry":"pm","transformParams":"d=320","targetResolution":"1280:720","warpType":"2","bitrate":"5000","encParams":"crf=30"}
      ]},
      {"yaw":"270","pitch":"0","roll":"0","representations": [
        {"geometry":"cm","transformParams":"d=640","targetResolution":"2160:2160","warpType":"1","bitrate":"20000","encParams":"crf=25","codec":"x265"},
        {"geometry":"pm","transformParams":"d=480","targetResolution":"1920:1080","warpType":"2","bitrate":"10000","encParams":"crf=27","codec":"x265"},
        {"geometry":"pm","transformParams":"d=320","targetResolution":"1280:720","warpType":"2","bitrate":"5000","encParams":"crf=30"}
      ]},
      {"yaw":"0","pitch":"90","roll":"0","representations": [
        {"geometry":"cm","transformParams":"d=640","targetResolution":"2160:2160","warpType":"1","bitrate":"20000","encParams":"crf=25","codec":"x265"},
        {"geometry":"pm","transformParams":"d=480","targetResolution":"1920:1080","warpType":"2","bitrate":"10000","encParams":"crf=27","codec":"x265"},
        {"geometry":"pm","transformParams":"d=320","targetResolution":"1280:720","warpType":"2","bitrate":"5000","encParams":"crf=30"}
      ]},
      {"yaw":"0","pitch":"-90","roll":"0","representations": [
        {"geometry":"cm","transformParams":"d=640","targetResolution":"2160:2160","warpType":"1","bitrate":"20000","encParams":"crf=25","codec":"x265"},
        {"geometry":"pm","transformParams":"d=480","targetResolution":"1920:1080","warpType":"2","bitrate":"10000","encParams":"crf=27","codec":"x265"},
        {"geometry":"pm","transformParams":"d=320","targetResolution":"1280:720","warpType":"2","bitrate":"5000","encParams":"crf=30"}
      ]},
```

FIG. 17A

```
{"yaw" : "0", "pitch" : "0", "roll" : "0", "representations" : [
  {"geometry" : "cm", "transformParams" : "d=640", "targetResolution" : "2160:2160", "warpType" : "1", "bitrate" : "20000", "encParams" : "crf=25", "codec" : "x265"},
  {"geometry" : "pm", "transformParams" : "d=480", "targetResolution" : "1920:1080", "warpType" : "2", "bitrate" : "10000", "encParams" : "crf=27", "codec" : "x265"},
  {"geometry" : "pm", "transformParams" : "d=320", "targetResolution" : "1280:720", "warpType" : "2", "bitrate" : "5000", "encParams" : "crf=30"}
  ]
},
"start" : "0",
"end" : "25000",
"viewports" : [
{"yaw" : "45", "pitch" : "0", "roll" : "0", "representations" : [
  {"geometry" : "cm", "transformParams" : "d=640", "targetResolution" : "2160:2160", "warpType" : "1", "bitrate" : "20000", "encParams" : "crf=25", "codec" : "x265"},
  {"geometry" : "pm", "transformParams" : "d=480", "targetResolution" : "1920:1080", "warpType" : "2", "bitrate" : "10000", "encParams" : "crf=27", "codec" : "x265"},
  {"geometry" : "pm", "transformParams" : "d=320", "targetResolution" : "1280:720", "warpType" : "2", "bitrate" : "5000", "encParams" : "crf=30"}
  ]
},
{"yaw" : "225", "pitch" : "0", "roll" : "0", "representations" : [
  {"geometry" : "cm", "transformParams" : "d=640", "targetResolution" : "2160:2160", "warpType" : "1", "bitrate" : "20000", "encParams" : "crf=25", "codec" : "x265"},
  {"geometry" : "pm", "transformParams" : "d=480", "targetResolution" : "1920:1080", "warpType" : "2", "bitrate" : "10000", "encParams" : "crf=27", "codec" : "x265"},
  {"geometry" : "pm", "transformParams" : "d=320", "targetResolution" : "1280:720", "warpType" : "2", "bitrate" : "5000", "encParams" : "crf=30"}
  ]
},
{"yaw" : "135", "pitch" : "0", "roll" : "0", "representations" : [
  {"geometry" : "cm", "transformParams" : "d=640", "targetResolution" : "2160:2160", "warpType" : "1", "bitrate" : "20000", "encParams" : "crf=25", "codec" : "x265"},
  {"geometry" : "pm", "transformParams" : "d=480", "targetResolution" : "1920:1080", "warpType" : "2", "bitrate" : "10000", "encParams" : "crf=27", "codec" : "x265"},
  {"geometry" : "pm", "transformParams" : "d=320", "targetResolution" : "1280:720", "warpType" : "2", "bitrate" : "5000", "encParams" : "crf=30"}
  ]
},
{"yaw" : "315", "pitch" : "0", "roll" : "0", "representations" : [
  {"geometry" : "cm", "transformParams" : "d=640", "targetResolution" : "2160:2160", "warpType" : "1", "bitrate" : "20000", "encParams" : "crf=25", "codec" : "x265"},
  {"geometry" : "pm", "transformParams" : "d=480", "targetResolution" : "1920:1080", "warpType" : "2", "bitrate" : "10000", "encParams" : "crf=27", "codec" : "x265"},
  {"geometry" : "pm", "transformParams" : "d=320", "targetResolution" : "1280:720", "warpType" : "2", "bitrate" : "5000", "encParams" : "crf=30"}
  ]
},
```

FIG. 17B

```
{
  "SegmentLength": "1000",
  "fps": "60",
  "gop": "10",
  "codec": "x264",
  "viewpoints":[
    {
      "id": 1,
      "next": "upperView360",
      "periods":
    }
  ],
  "viewports":[
    {"yaw": "0", "pitch": "45", "roll": "0", "representations": [
      {"geometry": "cm", "transformParams": "d=640", "targetResolution": "2160:2160", "warpType": "1", "bitrate": "20000", "encParams": "crf=25", "codec": "x265"},
      {"geometry": "pm", "transformParams": "d=480", "targetResolution": "1920:1080", "warpType": "2", "bitrate": "10000", "encParams": "crf=27", "codec": "x265"},
      {"geometry": "pm", "transformParams": "d=320", "targetResolution": "1280:720", "warpType": "2", "bitrate": "5000", "encParams": "crf=30"}
    ]},
    {"yaw": "90", "pitch": "0", "roll": "0", "faceId": "0", "representations": [
      {"geometry": "cm", "transformParams": "d=640, offcenterz=-0.25", "targetResolution": "2160:2160", "warpType": "2", "bitrate": "20000", "encParams": "crf=25", "codec": "x265"},
      {"geometry": "pm", "transformParams": "d=480, offcenterz=-0.15", "targetResolution": "1920:1080", "warpType": "2", "bitrate": "10000", "encParams": "crf=27", "codec": "x265"},
      {"geometry": "pm", "transformParams": "d=320", "targetResolution": "1280:720", "warpType": "0", "bitrate": "5000", "encParams": "crf=30"}
    ]}
  ]
}
```

FIG. 17C

```
{"yaw" : "270", "pitch" : "0", "roll" : "0", "representations" : [
  {"geometry" : "pm", "transformParams" : "d=840", "targetResolution" : "1920:1080", "warpType" : "2", "bitrate" : "10000", "encParams" : "crf=27", "codec" : "x265"},
  {"geometry" : "cm", "transformParams" : "d=840", "targetResolution" : "2160:2160", "warpType" : "1", "bitrate" : "20000", "encParams" : "crf=25", "codec" : "x265"},
  {"geometry" : "pm", "transformParams" : "d=480", "targetResolution" : "1280:720", "warpType" : "2", "bitrate" : "5000", "encParams" : "crf=30"}
]},
{"yaw" : "0", "pitch" : "90", "roll" : "0", "representations" : [
  {"geometry" : "cm", "transformParams" : "d=840", "targetResolution" : "2160:2160", "warpType" : "1", "bitrate" : "20000", "encParams" : "crf=25", "codec" : "x265"},
  {"geometry" : "pm", "transformParams" : "d=480", "targetResolution" : "1920:1080", "warpType" : "2", "bitrate" : "10000", "encParams" : "crf=27", "codec" : "x265"},
  {"geometry" : "pm", "transformParams" : "d=320", "targetResolution" : "1280:720", "warpType" : "2", "bitrate" : "5000", "encParams" : "crf=30"}
]},
{"yaw" : "0", "pitch" : "-90", "roll" : "0", "representations" : [
  {"geometry" : "cm", "transformParams" : "d=840", "targetResolution" : "2160:2160", "warpType" : "1", "bitrate" : "20000", "encParams" : "crf=25", "codec" : "x265"},
  {"geometry" : "pm", "transformParams" : "d=480", "targetResolution" : "1920:1080", "warpType" : "2", "bitrate" : "10000", "encParams" : "crf=27", "codec" : "x265"},
  {"geometry" : "pm", "transformParams" : "d=320", "targetResolution" : "1280:720", "warpType" : "2", "bitrate" : "5000", "encParams" : "crf=30"}
]}
]
},
{
"start" : "0",
"end" : "25000",
"viewports" : [
  {"yaw" : "45", "pitch" : "0", "roll" : "0", "representations" : [
    {"geometry" : "pm", "transformParams" : "d=480", "targetResolution" : "1920:1080", "warpType" : "2", "bitrate" : "10000", "encParams" : "crf=27", "codec" : "x265"},
    {"geometry" : "cm", "transformParams" : "d=840", "targetResolution" : "2160:2160", "warpType" : "1", "bitrate" : "20000", "encParams" : "crf=25", "codec" : "x265"},
    {"geometry" : "pm", "transformParams" : "d=320", "targetResolution" : "1280:720", "warpType" : "2", "bitrate" : "5000", "encParams" : "crf=30"}
  ]},
  {"yaw" : "225", "pitch" : "0", "roll" : "0", "representations" : [
    {"geometry" : "pm", "transformParams" : "d=480", "targetResolution" : "2160:2160", "warpType" : "1", "bitrate" : "20000", "encParams" : "crf=25", "codec" : "x265"},
    {"geometry" : "cm", "transformParams" : "d=840", "targetResolution" : "1920:1080", "warpType" : "2", "bitrate" : "10000", "encParams" : "crf=27", "codec" : "x265"},
    {"geometry" : "pm", "transformParams" : "d=320", "targetResolution" : "1280:720", "warpType" : "2", "bitrate" : "5000", "encParams" : "crf=30"}
  ]}
```

FIG. 17D

```
{
  "id" : 2,
  "name" : "lowerView180",
  "viewports" : [
    {
      "yaw" : "90", "pitch" : "0", "roll" : "0", "faceId" : "0", "representations" : [
        {"geometry" : "cm", "transformParams" : "d=640, offcenterz=-0.25", "targetResolution" : "2160:2160", "warpType" : "2", "bitrate" : "20000", "encParams" : "crf=25", "codec" : "x265"},
        {"geometry" : "pm", "transformParams" : "d=480, offcenterz=-0.15", "targetResolution" : "1920:1080", "warpType" : "2", "bitrate" : "10000", "encParams" : "crf=27", "codec" : "x265"},
        {"geometry" : "pm", "transformParams" : "d=320", "targetResolution" : "1280:720", "warpType" : "0", "bitrate" : "5000", "encParams" : "crf=30"}
      ]
    }
  ]
}
```

FIG. 17E

```
{
"periods" :
    [
        {
        "viewports":
            [
                {"yaw" : "90", "pitch" : "0", "roll" : "0", "representations" : [{"id" : "2"}, {"id" : "102"}, {"id" : "202"}]},
                {"yaw" : "270", "pitch" : "0", "roll" : "0", "representations" : [{"id" : "3"}, {"id" : "103"}, {"id" : "203"}]},
                {"yaw" : "0", "pitch" : "90", "roll" : "0", "representations" : [{"id" : "4"}, {"id" : "104"}, {"id" : "204"}]},
                {"yaw" : "0", "pitch" : "-90", "roll" : "0", "representations" : [{"id" : "5"}, {"id" : "105"}, {"id" : "205"}]},
                {"yaw" : "0", "pitch" : "0", "roll" : "0", "representations" : [{"id" : "6"}, {"id" : "106"}, {"id" : "206"}]},
                {"yaw" : "180", "pitch" : "0", "roll" : "0", "representations" : [{"id" : "7"}, {"id" : "107"}, {"id" : "207"}]},
            ]
        },
        {
        "start" : "0",
        "end" : "25000",
        "viewports" :
            [
                {"yaw" : "45", "pitch" : "0", "roll" : "0", "representations" : [{"id" : "8"}, {"id" : "108"}, {"id" : "208"}]},
                {"yaw" : "225", "pitch" : "0", "roll" : "0", "representations" : [{"id" : "9"}, {"id" : "109"}, {"id" : "209"}]},
                {"yaw" : "135", "pitch" : "0", "roll" : "0", "representations" : [{"id" : "10"}, {"id" : "110"}, {"id" : "210"}]},
                {"yaw" : "315", "pitch" : "0", "roll" : "0", "representations" : [{"id" : "11"}, {"id" : "111"}, {"id" : "211"}]},
                {"yaw" : "0", "pitch" : "45", "roll" : "0", "representations" : [{"id" : "12"}, {"id" : "112"}, {"id" : "212"}]},
                {"yaw" : "0", "pitch" : "-45", "roll" : "0", "representations" : [{"id" : "13"}, {"id" : "113"}, {"id" : "213"}]}
            ]
        }
    ]
}
```

FIG. 18A

```
{
"viewports":
  [
    {
      "name": "upperView360",
      "id": 1,
      "periods":
      [
        {
          "viewports":
          [
            {"yaw" : "90",  "pitch" : "0",   "roll" : "0", "representations" : [{"id" : "2"}, {"id" : "3"}, {"id" : "4"}]},
            {"yaw" : "270", "pitch" : "0",   "roll" : "0", "representations" : [{"id" : "5"}, {"id" : "6"}, {"id" : "7"}]},
            {"yaw" : "0",   "pitch" : "90",  "roll" : "0", "representations" : [{"id" : "8"}, {"id" : "9"}, {"id" : "10"}]},
            {"yaw" : "0",   "pitch" : "-90", "roll" : "0", "representations" : [{"id" : "11"}, {"id" : "12"}, {"id" : "12"}]}
          ]
        },
        {
          "start" : "0",
          "end" : "25000",
          "viewports" :
          [
            {"yaw" : "45",  "pitch" : "0", "roll" : "0", "representations" : [{"id" : "13"}, {"id" : "14"}, {"id" : "15"}]},
            {"yaw" : "225", "pitch" : "0", "roll" : "0", "representations" : [{"id" : "16"}, {"id" : "17"}, {"id" : "18"}]}
          ]
        },
        {
          "name": "lowerView180",
          "id": 2,
          "viewports":
          [
            {"yaw" : "90", "pitch" : "0", "roll" : "0", "representations" : [{"id" : "19"}, {"id" : "20"}, {"id" : "21"}]}
          ]
        }
      ]
    }
  ]
}
```

FIG. 18B

YAW

| SOURCE DATA | FEATURE TREATMENT | | | | | |
|---|---|---|---|---|---|---|
| yawRadians | yawDegrees | yawNormalized | yawSpeedNormalized | YAW-180TO-170 | ... | YAW+170TO+180 |
| SIMPLE TRANSFORM TO DEGREES | | -1 TO 1 RANGE | 1ST DERIVATIVE OF YAWNORMALIZED | BINNING/BUCKETING OF THE FEATURE BASED ON DEGREES | | |

PITCH

| SOURCE DATA | FEATURE TREATMENT | | | | | |
|---|---|---|---|---|---|---|
| pitchRadians | pitchDegrees | pitchNormalized | pitchSpeedNormalized | PITCH-190TO-80 | ... | YAW+80TO+90 |
| SIMPLE TRANSFORM TO DEGREES | | -1 TO 1 RANGE | 1ST DERIVATIVE OF PITCHNORMALIZED | BUCKETING OF THE FEATURE BASED ON DEGREES | | |

ROLL

| SOURCE DATA | FEATURE TREATMENT | | | | | |
|---|---|---|---|---|---|---|
| rollRadians | rollDegrees | rollNormalized | rollSpeedNormalized | ROLL-180TO-170 | ... | ROLL+170TO+180 |
| SIMPLE TRANSFORM TO DEGREES | | -1 TO 1 RANGE | 1ST DERIVATIVE OF ROLLNORMALIZED | BUCKETING OF THE FEATURE BASED ON DEGREES | | |

CONTENT TIMESTAMP

| SOURCE DATA | FEATURE TREATMENT | | | |
|---|---|---|---|---|
| RAW (ms) | contentNormalized | firstQ | middleH | lastQ |
| | 0 TO 1 RANGE | BUCKETING OF THE FEATURE TO SEPERATE THE FIRST QUARTILE | BUCKETING OF THE FEATURE TO SEPERATE THE MIDDLE HALF OF THE CONTENT | BUCKETING OF THE FEATURE TO SEPERATE THE LAST QUARTILE |

SESSION

| SOURCE DATA | FEATURE TREATMENT | |
|---|---|---|
| sessionId | | |
| | sessionshort | RELATIONAL FLAG: IF A SESSION DID NOT REACH AT LEAST 0.5 DURATION (MEASURED AS CONTENTNORMALIZED DISTANCE BETWEEN BEGINNING AND END OF SESSION) |
| | sessioncomplete | RELATIONAL FLAG: IF A SESSION HAS THE ENTIRE RANGE OF 0-1 IN CONTENTNORMALIZED, THIS FLAG IS ON |

FRAME

| SOURCE DATA | FEATURE TREATMENT |
|---|---|
| RAW (image) | CONVOLUTION TYPE 1 |
| | LINEAR SUBSAMPLING |
| | CONVOLUTION TYPE 2 |
| | ANGLE-AWARE SUBSAMPLING |

TIME

| SOURCE DATA | FEATURE TREATMENT |
|---|---|
| timestamp | TIME OF DAY |
| timezone | SIMPLE MAPPING FROM TS |
| | DAY OF WEEK |
| | SIMPLE MAPPING FROM TS |

FIG. 27

| | AMOUNT PER DATA POINT | | | |
|---|---|---|---|---|
| CONTENT | 1 | contentClass | | |
| TIME | 1 | contentTs | timeOfDay | |
| CURRENT POSITION | 1 | yawNormalized | pitchNormalized | rollNormalized |
| CURRENT TREND | 1 | yawSpeedNormalized | pitchSpeedNormalized | rollSpeedNormalized |
| PAST POSITION | X | lastxStepYawNormalized | lastxStepPitchNormalized | lastxStepRollNormalized |
| FRAME | 1 | convolution type 2 | | |

METHODS AND APPARATUSES FOR IMAGE PROCESSING TO OPTIMIZE IMAGE RESOLUTION AND FOR OPTIMIZING VIDEO STREAMING BANDWIDTH FOR VR VIDEOS

CROSS-REFERENCE

This application claims the benefit of U.S. Provisional Application No. 62/478,780, filed Mar. 30, 2017, entitled METHODS AND APPARATUSES TO OPTIMIZE RESOLUTION AND BANDWIDTH FOR VR VIDEOS which application is incorporated herein by reference.

BACKGROUND

Field

Embodiments relate to real-time or pseudo-real-time video transfer between a source and a destination where packets are transmitted.

Background

One of the most important approaches to create virtual reality (VR) experiences is that of reusing existing digital video capabilities instead of relying solely on computer three-dimensional (3D) graphics. This approach is generally referred to as VR video (e.g. 180 degree and 360 degree video) and can be applied both for artificial environments and real world video capture alike. This approach has the advantage of re-utilizing existing capabilities in user devices already massively adopted such as smartphones, personal computers and VR head glasses.

A main differentiator of the VR video approach compared to traditional 3D graphics methods is that even using a 4 k Ultra-High Definition (UHD) television is not sufficient to provide the right level of quality to produce a satisfactory VR immersion for users. Also, with the higher frame rates needed to provide a realistic experience for most content involving dynamic scenes, like sports, concerts, action movies or similar type of content, 60 frames per second becomes a minimum necessary frame rate. Adding to these requirements, the stereo video format can even duplicate the amount of information needed. As a consequence, resolutions above 4 k and bitrates, even well above 60 Mbps, may be needed to transmit high quality signals, which may be unmanageable for massive deployments over existing networks and for user devices and players. These high bandwidth and resolution requirements can prove to be a difficult barrier to overcome for users, depending on factors such as income level, geography and maturity of internet connectivity, thus the addressable population might be severely narrowed.

In the context of VR video and its high-resolution requirements, the existing transcoding methods may also result in the need of a very high computational power, and the time to prepare the streams increases exponentially. Another significant consequence is that the transmission of live events with high resolution and reliability is difficult with current technology.

What is needed are solutions capable of improving the quality of the 360 degree video experience for users and the speed at which high quality VR video content is created, including creation of VR video content in real-time. Additionally, solutions are needed to improve the transmission of VR video.

SUMMARY

The present disclosure describes a solution capable of improving the quality of the 360 video experience and the speed to prepare high quality VR video content in real-time. The solution solves the current problems in a novel way that remains compatible with existing hardware, video codecs (coder-decoder) and streaming protocols. An additional benefit of the disclosed solutions is that there are no additional requirements imposed on devices. This solution includes server and client components that enable streaming over the internet at optimized bitrates with high quality, and is applicable for live content and for file based content.

The first part of the description covers an ingest method of the video content and a mechanism to segment the incoming content in fragments and store them in a repository. Such segmentation allows the synchronization of live video content when processing in parallel processes in subsequent steps in the workflow.

According to an aspect of the description, the method covers the processing of a VR video into a set of videos that allocate a larger part of the resolution to a specific region of the input image. Each of these specific regions is called a viewport.

Another aspect of the disclosure describes a process by which an input "recipe" file is used to orchestrate the generation of adequate viewports and time periods in a flexible way.

Still another aspect of the disclosure describes method further describes a secondary mechanism to reassign pixels within a viewport to maximize resolution around the center of the viewport.

Yet another aspect of the disclosure describes a method describes a mechanism for video frame-stamping. which is done in order to provide the client-side player with a way to determine the exact characteristics of each optimized video frame displayed to the user.

Another aspect of the disclosure describes the mechanism to map desired values into a bit stream for adequate frame stamping.

Another aspect of the disclosure describes a parity-based data quality assurance mechanism for the frame stamps.

Yet another aspect of the disclosure describes the flexibility frame stamping provides with regards to viewport implementation and switching, allowing for a rich mix of geometrical transformation, projection, and video resolution approaches.

Still another aspect of the disclosure describes the utilization of standard codecs (such as H.264 or H.265 (or MPEG-4 Part 10, Advanced Video Coding (MPEG-4 AVC) a block-oriented motion-compensation-based video compression standard) and package the viewports for average bit rate (ABR) transmission following standard mechanisms (such as MPEG-DASH or HLS) to encode and package the generated videos. The disclosure also covers a secondary mechanism to improve encoding efficiency (without modifying codec implementation) in the case of stereoscopic video by removing unnecessary image complexity in parts of the stereoscopic image.

Another aspect of the disclosure describes a method for the generation of additional signaling metadata to identify the viewport conformation.

Yet another aspect of the disclosure describes the client side of the method followed to decode and present the VR video content.

Still another aspect of the disclosure presents the mechanism used by the client to decode the metadata produced in order to receive the information about viewport configurations, and use the viewport configuration information to fetch the most relevant optimized viewport.

Another aspect of the disclosure presents the mechanism used by the client to use the decoded metadata to present the incoming video frame appropriately, according to the specific viewport configuration.

Yet another aspect of the disclosure presents the utilization of client headset mechanisms to determine the position of the head of the user, used to select the adequate viewport stream.

Still another aspect of the disclosure further describes the client-side utilization of predictive models to estimate the future head position, which is in turn used to further optimize the request of appropriate viewports on the client side.

Another aspect of the disclosure further describes the capability to request more than one viewport in parallel to allow for faster viewport change capability, and the mechanism to detect the moment when the viewport change can be displayed to the user seamlessly.

Yet another aspect of the disclosure describes the mechanism by which the client decodes the frame stamp to acquire information about the frame about to be displayed, and the mechanism by which adjustments in the projected viewport are performed at the time of displaying the frame to the user.

Still another aspect of the disclosure further describes the utilization of the parity-based data quality mechanism to ensure that the frame stamp is being read properly and to act as backward compatibility enabler.

Another aspect of the disclosure further describes the parallel processing mechanism by which the set of viewports can be generated and packaged in real-time.

Yet another aspect of the disclosure describes the data collection mechanism by which information about the video playback and the user's position is transmitted back to an analytics backend, as well as the relevant data elements collected to know about user experience and behavior.

Still another aspect of the disclosure further depicts the backend mechanisms to aggregate and treat data to train machine learning models that help in client-side predictions.

These and other aspects of the disclosure and related embodiments will become apparent in view of the detailed disclosure of the embodiments that follow below.

An aspect of the disclosure is directed to methods comprising: receiving a video input having at least an 8 k resolution; processing the received video input into two or more viewport segments that at least allocate more pixels in a first region and fewer pixels in a second region wherein processing the received video input into two or more viewport segments is performed in parallel; generating a first signaling information wherein the first signaling information is external metadata; and generating a second signaling information wherein the second signaling information is embedded metadata. Additionally, the methods can include one or more of the steps of playing the processed video, embedding the first signaling information and the second signaling information into one or more video frames, processing the received video input real-time, and generating adaptive bit rate renditions. Additionally, the step of generating adaptive bit rate renditions is configurable to further comprise a frame treatment process to optimize transmission of a stereoscopic video. The methods can also include the additional steps of communicating with a gaze position monitor to fetch an appropriate viewport, and parsing an embedded frame metadata at a client side for playback. Additionally, in some configurations, the step of calculating a predicted head position for a user and adjusting a playback request can be included in the response to the predicted head position. The steps of fetching a model state, training the model state, and saving the model state can also be included.

Another aspect of the disclosure is directed to servers comprising: a memory; a controller configured to receive a video input having at least an 8 k resolution; process the video input into two or more viewport segments that allocate more pixels to a first region, resulting in less pixels allocated to a second region, wherein the two or more viewport segments are created in parallel, generate signaling information, both as external metadata and as embedded metadata in the video frames, and deliver the processed video input to a standard streaming origin folder for device streaming. The servers can be streaming servers. Additionally, the controller can be further configurable to at least one or more of segment the input video as a first process, set-up the processing tasks from a segmented source, detect pending processing tasks and process only those, which allows for several such servers to work efficiently in parallel, and generate an adaptive bit rate rendition, with additional optional frame treatment to further optimize transmission of stereoscopic videos.

Still another aspect of the disclosure is directed to methods comprising: receiving a video input with a resolution of at least 8 k resolution having two or more video frames into a system; processing the received video input into two or more viewport segments that at least allocate more pixels in a first region and fewer pixels in a second region wherein processing the received video input into two or more viewport segments is performed in parallel; generating a first signaling information as external metadata and a second signaling information as embedded metadata in the two or more video frames; and delivering a processed video input from the system to a client device. The methods are further configurable to comprise one or more of the steps of adding embedded metadata into the video frames and generating additional signaling information of viewports, and generating adaptive bit rate renditions, with additional optional frame treatment to further optimize transmission of stereoscopic videos.

Yet another aspect of the disclosure is directed to methods comprising: receiving a video input having at least an 8 k resolution; processing the received video input; generating a first signaling information wherein the first signaling information is external metadata; generating a second signaling information wherein the second signaling information is embedded metadata; and embedding the first signaling information and the second signaling information into one or more video frames. The methods are further configurable to comprise one or more of playing the processed video, processing the received video input into two or more viewport segments that at least allocate more pixels in a first region and fewer pixels in a second region wherein processing the received video input into two or more viewport segments is performed in parallel, processing the received video input real-time, and generating adaptive bit rate renditions. Additionally, the step of generating adaptive bit rate renditions is further configurable to comprise a frame treatment process to optimize transmission of a stereoscopic video in some configurations. Additionally, the steps of communicating with a gaze position monitor to fetch an appropriate viewport, and parsing an embedded frame metadata at a client side for playback can also be included in some configurations. The step calculating a predicted head position for a user and adjust a playback request in response to the predicted head position can also be provided. In some configurations, the steps also include fetching a model state, training the model state, and saving the model state.

Another aspect of the disclosure is directed to servers comprising: a memory; a controller configured to receive a video input having at least an 8 k resolution; process the video input, segment the input video as a first process from a segmented source, generate signaling information, both as external metadata and as embedded metadata in the video frames, and deliver the processed video input to a standard streaming origin folder for device streaming. The server can be a streaming server, or any other suitable server configuration. Additionally, the controller is further configurable to process the video input into two or more viewport segments that allocate more pixels to a first region, resulting in less pixels allocated to a second region, wherein the two or more viewport segments are created in parallel. In some configurations, the controller is further configured to detect pending processing tasks and process only those, which allows for several such servers to work efficiently in parallel. In still other configurations, the controller is further configured to generate an adaptive bit rate rendition, with additional optional frame treatment to further optimize transmission of stereoscopic videos.

Yet another aspect of the disclosure is directed to methods comprising: receiving a video input with a resolution of at least 8 k resolution having two or more video frames into a system; processing the received video input; generating a first signaling information wherein the first signaling information is external metadata; generating a second signaling information wherein the second signaling information is embedded metadata; embedding the first signaling information and the second signaling information into one or more video frames, and delivering a processed video input from the system to a client device. The methods can further comprise the step of adding embedded metadata into the video frames and generating additional signaling information of viewports and/or generate adaptive bit rate renditions, with additional optional frame treatment to further optimize transmission of stereoscopic videos.

Still another aspect of the disclosure is directed to methods comprising: receiving a video input having at least an 8 k resolution; processing the received video input into two or more viewport segments; generating a first signaling information wherein the first signaling information is external metadata; generating a second signaling information wherein the second signaling information is embedded metadata; and communicating with a gaze position monitor to fetch an appropriate viewport. The methods can also comprise the step of playing the processed video. In at least some configurations, the step of embedding the first signaling information and the second signaling information into one or more video frames. Additionally, the received video input can be processed real-time. Some configurations of the method also include the step of generating adaptive bit rate renditions. Generating adaptive bit rate renditions can also further comprise a frame treatment process to optimize transmission of a stereoscopic video. In at least some configurations, the steps include one or more of parsing an embedded frame metadata at a client side for playback, calculating a predicted head position for a user and adjust a playback request in response to the predicted head position, fetching a model state, training the model state, and saving the model state.

Another aspect of the disclosure is directed to servers comprising: a memory; a controller configured to receive a video input having at least an 8 k resolution; process the video input, generate signaling information, both as external metadata and as embedded metadata in the video frames, deliver the processed video input to a standard streaming origin folder for device streaming; and communicate with a gaze position monitor to fetch an appropriate viewport. The controller can be further configured to segment the input video as a first process, set-up the processing tasks from a segmented source, detect pending processing tasks and process only those, which allows for several such servers to work efficiently in parallel, and/or generate an adaptive bit rate rendition, with additional optional frame treatment to further optimize transmission of stereoscopic videos.

Yet another aspect of the disclosure is directed to methods comprising: receiving a video input with a resolution of at least 8 k resolution having two or more video frames into a system; processing the received video; generating a first signaling information as external metadata and a second signaling information as embedded metadata in the two or more video frames; and communicating with a gaze position monitor to fetch an appropriate viewport. The methods are configurable to further comprise the step of adding embedded metadata into the video frames and generating additional signaling information of viewports. The step of generating adaptive bit rate renditions, with additional optional frame treatment can be further configured to optimize transmission of stereoscopic videos.

Another aspect of the disclosure is directed to methods comprising: receiving a video input having at least an 8 k resolution; processing the received video input having two or more video frames wherein each video frame has a first half and a second half; increasing a bitrate in the first half of a first video frame and reducing a bit rate in the second half of the first video frame; and reducing an overall encoded bitrate for the video input. The methods can additional comprise one or more of playing the processed video, embedding a first signaling information and a second signaling information into one or more video frames, processing the received video input real-time, and generating adaptive bit rate renditions. Additionally, in some configurations, step of generating adaptive bit rate renditions can further comprise a frame treatment process to optimize transmission of a stereoscopic video. Additionally, the method can comprise the steps of communicating with a gaze position monitor to fetch an appropriate viewport, and parsing an embedded frame metadata at a client side for playback. The method can also include the step of calculating a predicted head position for a user and adjust a playback request in response to the predicted head position. In at least some configurations, the method also includes fetching a model state, training the model state, and saving the model state.

Another aspect of the disclosure is directed to servers comprising: a memory; a controller configured to receive a video input having at least an 8 k resolution; increase a bitrate in the first half of a first video frame and reduce a bit rate in the second half of the first video frame; and reduce an overall encoded bitrate for the video input. Servers can be streaming servers. Additionally, the controller can further be configured to at least one of segment the input video as a first process, set-up the processing tasks from a segmented source, detect pending processing tasks and process only those, which allows for several such servers to work efficiently in parallel, and generate an adaptive bit rate rendition, with additional optional frame treatment to further optimize transmission of stereoscopic videos.

Still another aspect of the disclosure is directed to methods comprising: receiving a video input with a resolution of at least 8 k resolution having two or more video frames into a system; processing the received video input into two or more viewport segments that at least allocate more pixels in a first region and fewer pixels in a second region wherein processing the received video input into two or more viewport segments is performed in parallel; generating a first signaling information as external metadata and a second signaling information as embedded metadata in the two or more video frames; and delivering a processed video input from the system to a client device. Additionally, the method can comprise the step of adding embedded metadata into the video frames and generating additional signaling information of viewports, and/or generating adaptive bit rate renditions, with additional optional frame treatment to further optimize transmission of stereoscopic videos.

INCORPORATION BY REFERENCE

All publications, patents, and patent applications mentioned in this specification are herein incorporated by reference to the same extent as if each individual publication, patent, or patent application was specifically and individually indicated to be incorporated by reference.
US 2016/0065946 A1 published Mar. 3, 2016, to Cole et al. for Methods and Apparatus for Capturing, Streaming and/or Playing Back Content;
US 2016/0142697 A1 published May 19, 2016 to Budagavi et al. for Coding of 360 Degree Videos Using Region Adaptive Smoothing;
US 2016/0150212 A1 published May 26, 2016 to Moura et al. for Live Selective Adaptive Bandwidth;
US 2016/0219241 A1 published Jul. 28, 2016 to Korneliussen et al. for Video Transmission Based on Independently Encoded Background Updates;
US 2016/0260196 A1 published Sep. 8, 2016 to Roimela for Video Streaming Method;
US 2016/0352791 A1 published Dec. 1, 2016 to Adams et al. for Streaming Spherical Video;
US 2016/0353146 A1 published Dec. 1, 2016 to Weaver et al. for Method and Apparatus to Reduce Spherical Video Bandwidth to User Headset;
US 2016/0381398 A1 published Dec. 29, 2016 to Saxena et al. for Generating and Transmitting Metadata for Virtual Reality;
US 2017/0039881 A1 published Feb. 9, 2017 to Belch et al. for Sports Training Using Virtual Reality;
U.S. Pat. No. 9,473,758 B1 issued Oct. 18, 2016 to Long et al. for Methods and Systems for Game Video Recording and Virtual Reality Replay;
EL-GANAINY, et al., "Streaming Virtual Reality Content," Dec. 26, 2016, available from https://arxiv.org/pdf/1612.08350;
HOSSEINI et al., "Adaptive 360 VR Video Streaming: Divide and Conquer!, Jan. 23, 2017, available from https://arxiv.org/pdf/1609.08729;
KINGDOM, et al., "Binocular Vision: The Eyes Add and Subtract," Current Biology, Vol, 22(1), Jan. 10, 2012, pp. R22-R24; and
PIXVANA, "An Intro to FOVAS: Field of Vision Adaptive Streaming for Virtual Reality," Jun. 16, 2016, available from http://blog.pixvana.com/intro-to-field-of-view-adaptive-streaming-for-vr.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:
FIGS. 17A-E illustrate an exemplar recipe file to generate optimized view ports;
FIGS. 18A-B illustrate an example of additional signaling generated for signaling information generated ion JSON format;
FIGS. 26A-B illustrate a concrete feature engineering chain for view direction models that can go through the flow depicted in FIG. 25;
FIG. 27 illustrates a schema for a training set of data could be after the process of FIGS. 26A-B.

DETAILED DESCRIPTION

Figure 1:
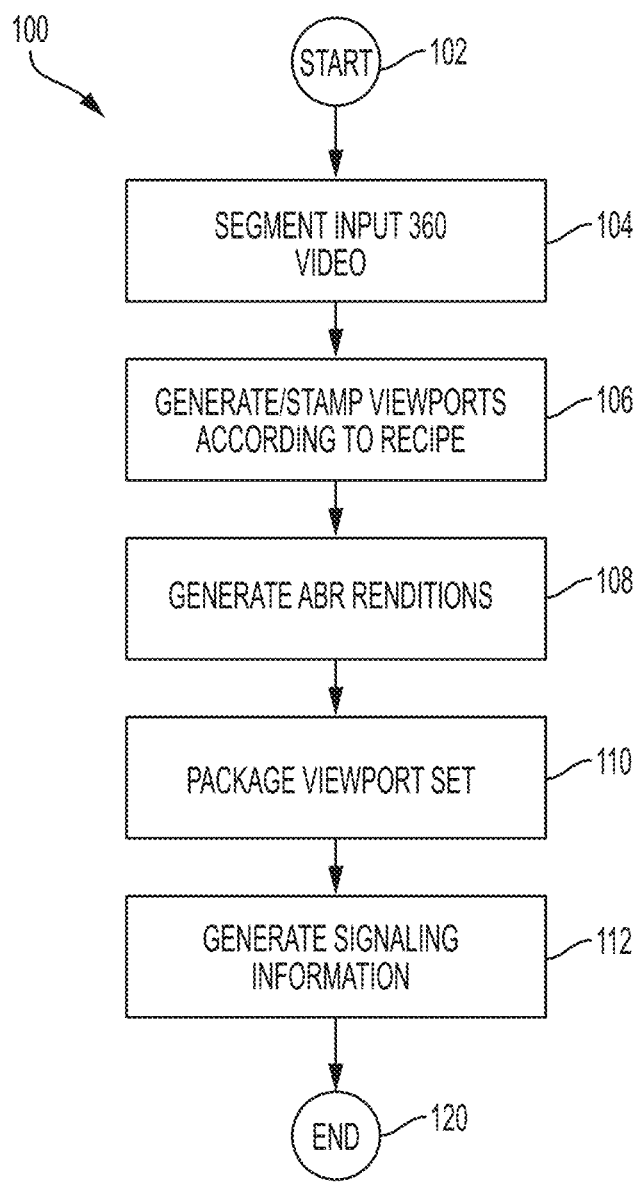
FIG. 1 is a high-level overview of the backend VR processing flow.

As illustrated in FIG. 1, a VR video processing flow 100 is illustrated which is an entry point of the disclosed methods and apparatuses. On the backend of the VR video processing flow 100 is a high quality VR video input (e.g., 360 and 180 degree videos being the most common videos); an equirectangular projection is a commonly utilized format for this purpose, though other geometries are also possible (e.g. cube maps, fisheye lens output). The VR video processing flow 100 starts 102 with an incoming video segment input 104. The incoming VR video segment input 104 is processed and segmented in order to perform the step of generating and stamping viewports according to the recipe 106, which will be further processed to apply the transformation according to the specified geometry and re-encoded to general several bitrates for generating ABR renditions 108. Once the ABR renditions 108 are generated, the package viewport is set 110. Finally, additional signaling information is generated 112 to allow the client side to parse the viewport information appropriately. At that point the VR video processing flow 100 ends 120.

Figure 22:
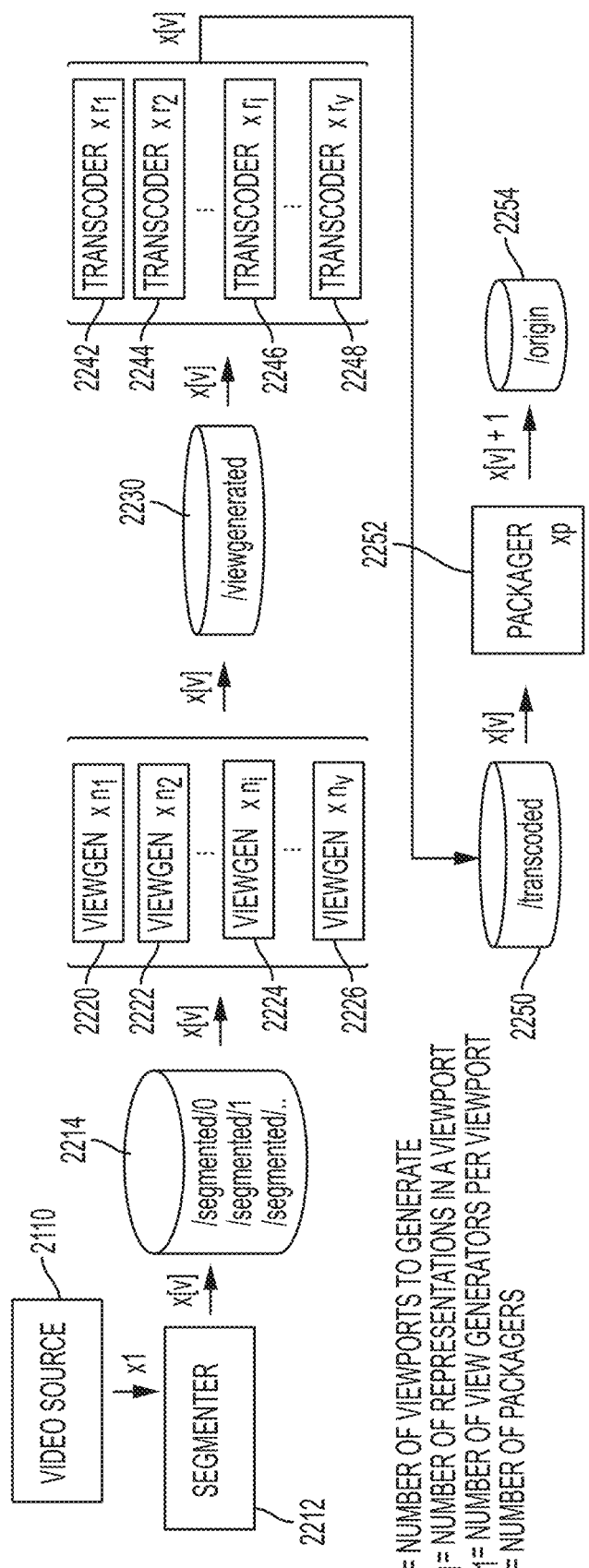

All the processing steps (occurring during steps 106-110 shown in FIG. 1) need parallel computation power due to the high resolution requirements, frame rate and stereoscopy of the content. This additional processing power is needed to address potential problems including, for example: desynchronization of frames, which can result in desynchronization of the audio and video tracks, or even between viewports. In order to ensure synchronization, the proposed embodiment proposes a method to ensure the ingestion of the video content in time segments (or simply segments) as the 360 video segment input 104 is provided. The video segments use a closed group of pictures (GOP) and are stored in files in a shared repository, with a file name coded as a function of the fragment number, as illustrated in FIG. 22. Further processing will thus be able to be applied to individual segment files in parallel without losing the synchronization of the entire video by using the file name as the reference of the sequence.

Figure 21:
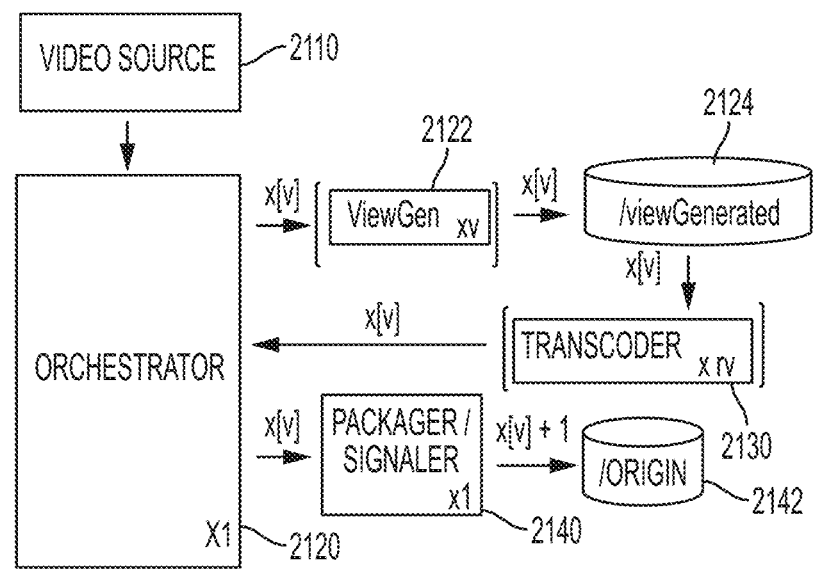
FIGS. 21-22 illustrate scalability consideration for the processing of on-demand and live VR video, identifying the key variables that drive growth of compute nodes in each case, and the temporary storage repositories needed in each case.

All of the parallel processing needed for the viewport generation and encoding will be managed automatically by the system by adjusting the number of processes to the generated segmented files. FIGS. 21-22 illustrate the considerations taken for on-demand and live scenarios: In FIG. 21 the on-demand case is depicted as requiring less parallel computing for the generation of views and for the transcoding of the views, whereas FIG. 22 depicts that, in order to attain a real-time processing speed, the systems and apparatuses are designed to take "n" parallel ViewGen computing nodes for a single viewport.

The disclosed methods ensure that a single process is assigned to a single file at a time, by assigning the correct single file name. When a file is being processed, the file name is modified to a new coded name, so that a new process is only established for the files that have not been renamed and thus already assigned to a process. By modifying the file name to a new coded name, the system can run several processes simultaneously and in parallel. For example, different video files can be processed in parallel while the methods are run on lighter computing nodes.

As will be appreciated by those skilled in the art, the parallel processes are applicable in contexts beyond VR video content. For example, parallel processes can be applied to any video content type where parallel processing of the content is necessary or useful and synchronization of the parallel jobs can become a concern.

As it becomes evident, the amount of possible combinations (codecs, resolutions, geometrical transformations and other adjustments that can be performed to the VR video stream) is quite significant. For this reason, it becomes necessary during the step of generating and stamping viewports according to the recipe 106 to use a configuration file containing a set of steps describing the transformations that should take place for a given source video. As will be appreciated by those skilled in the art, the recipe can provide for quite a bit of flexibility during actual operation while still achieving the desired results. This file is called the processing recipe and is illustrated in, for example, FIGS. 17A-E, illustrate how the recipe is configurable to contain different descriptive blocks of viewports detailing the geometric and video encoding characteristics of the block viewports, as well as the period of time in which the block viewports could be utilized for display. In addition to this file, a full parsing and execution process can be provided to adequately perform the step of generating and stamping viewports according to the recipe 106.

Figure 2:
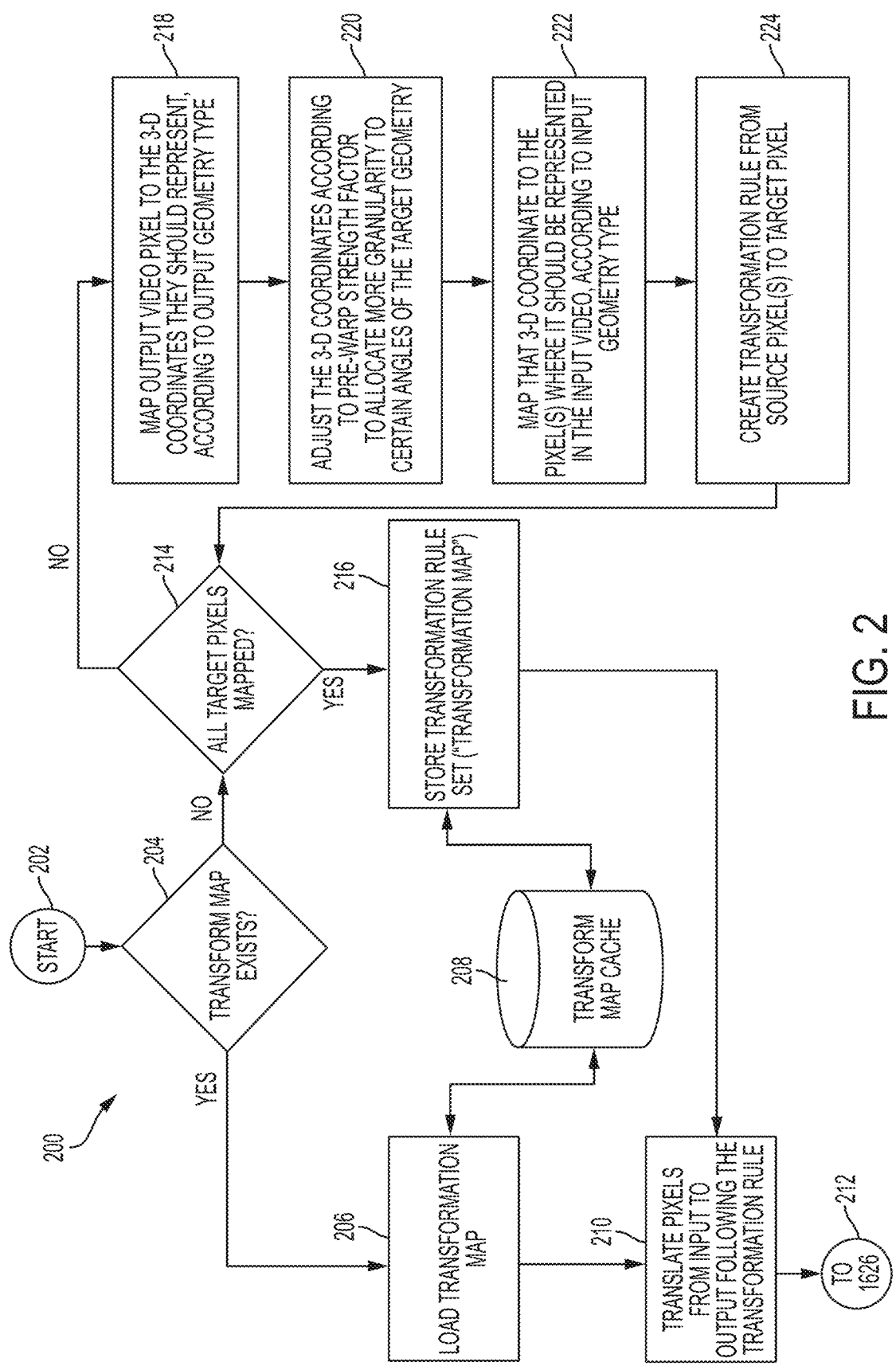
FIG. 2 illustrates a high-level overview of the flow that takes place to produce a geometrically transformed frame.

FIG. 2 illustrates a high-level flow for viewport generation 200. The high-level flow for the viewport generation 200 process starts 202 by determining whether a transform map exists 204. If a transform map exists (YES) then a transformation map is loaded 206. After loading the transformation map 206, pixels are translated by the system from input to output following a transformation rule 210. Additionally, once the transformation map is loaded 206 by the system, data can be retrieved from or provided to a transformation map cache 208 for storage. If the transformation map does not exist (NO), the system determines whether all target pixels are mapped 214. If all target pixels are not mapped (NO), then the output video pixel is mapped by the system to the 3D coordinates and the system determines that the video pixels should represent according to, for example, output geometry type 218. As an optional step, once the output video pixel is mapped, the 3D coordinates are adjusted according to pre-warp strength factors to allocate more granularity to selected angles of the target geometry of 3D coordinates according to pre-warping strength 220. As will be appreciated by those skilled in the art, multiple pre-warp methods can also be used during this optional step without departing from the scope of the disclosure.

Once the 3D coordinates are adjusted by the system, the 3D coordinates are mapped by the system to the pixels where the pixels should be represented in the input video according to an input geometry type 222. Once the 3D coordinates are mapped by the system, a transformation rule is created from one or more source pixels to one or more target pixels 224. At this point, the target pixels are mapped (YES), and the transformation rule set (or transformation map) is stored 216. Data can be retrieved from or provided to a transformation map cache 208 from the stored transformation rule set. Once the transformation rule set is stored 216 by the system, pixels from input to output can be translated following the transformation rule 210, and then the process proceeds to the stamp transformed viewport 1626 step in FIG. 16.

Figure 16:
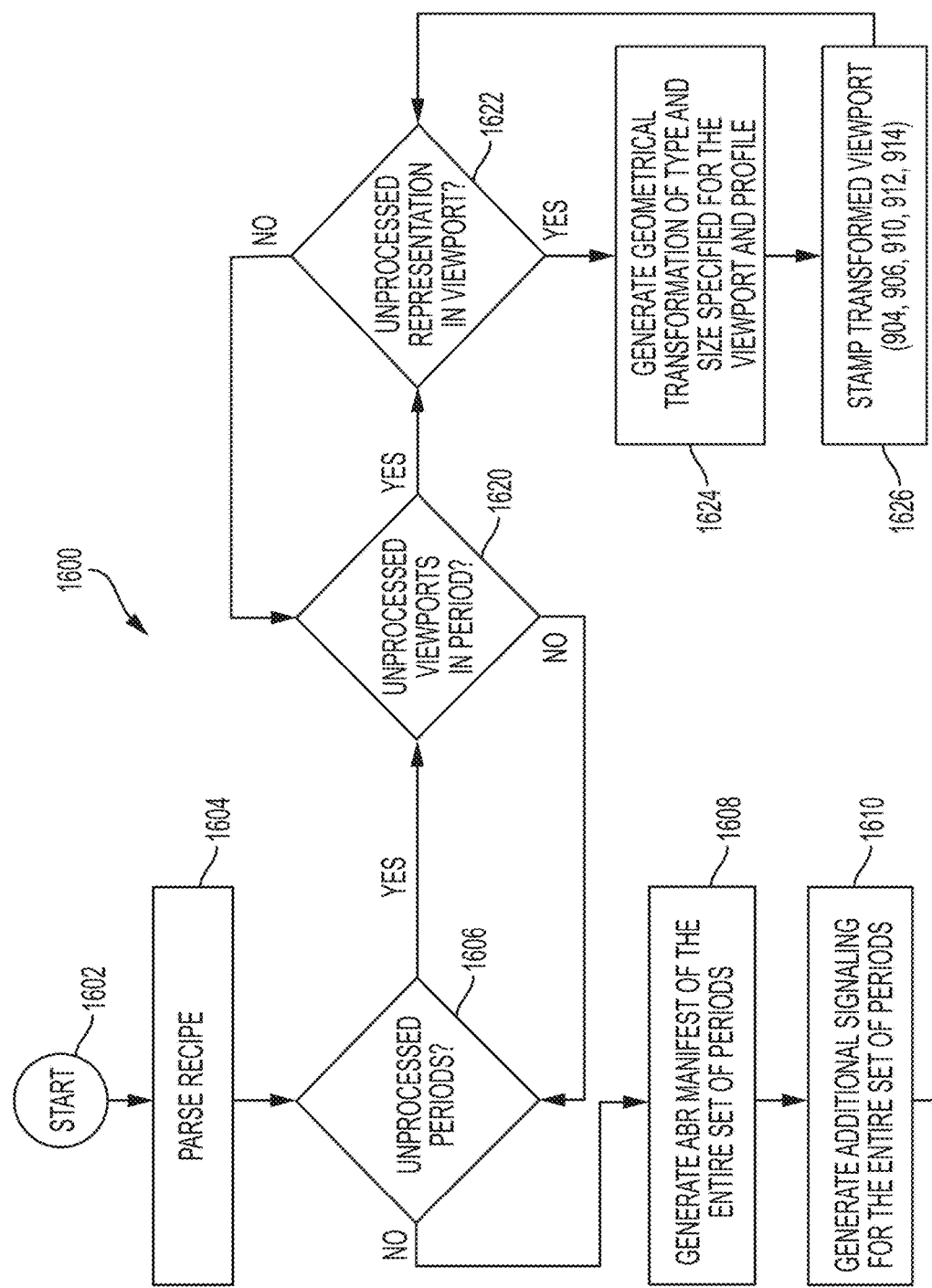
FIG. 16 illustrates a basic flow diagram by which a complete set of processing instructions (called the "recipe") are parsed to produce the desired set of optimized VR video.

FIG. 16 describes in further detail the inner workings of the step of generating and stamping viewports 1600 by the system according to the step of generating and stamping viewports of the recipe 106 (FIG. 1), which are controlled by a dedicated orchestration compute node. After starting 1602, during a first step, the recipe file is parsed 1604 to determine the amount of time periods that should be processed. Once the recipe is parsed 1604, the system determines if there are unprocessed periods 1606. If there are no unprocessed periods (NO), then an ABR manifest is generated by the system of the entire set of periods 1608, followed by generating additional signally for the entire set of periods 1610, and ending the process 1612.

If there are unprocessed periods (YES), then the system determines whether unprocessed viewports are in the period 1620. If there are no unprocessed viewports in the period (NO), then the process returns to the step of determining if there are unprocessed periods 1606. If there are unprocessed viewports in the period (YES), then the system determines if there are unprocessed representations in the viewport 1622. If there are no unprocessed representations in the viewport (NO), then the process returns to the step of determining whether unprocessed viewports are in the period 1620. If there are unprocessed representations in the viewport (YES), then the system generates geometrical transformations of a type and size specified for the viewport and profile at the step of generating geometrical transformation 1624, and stamp transformed viewport 1626. The step of generating geometrical transformation 1624 and stamping transformed viewports 1626, can involve the actual generation of a geometrical transformation. The step of generating geometrical transformation 1624 is summarized in FIG. 2 (steps 206-220) and the process of stamping transformed viewports 1626 is summarized in FIG. 9 (steps 904-914). As will be appreciated by those skilled in the art, these two processes can be performed either in sequential mode (for example, performed by the same computing node called ViewGen in FIG. 22), or in a parallel mode (for example, by separate nodes coordinated by the orchestration node in FIG. 2). The processing in parallel would typically require the nodes generating the views to receive and report on individual processing jobs to the orchestrator, particularly regarding the completion of the processes. Once all periods, viewports and representations are finished, it can proceed to the step of generating ABR renditions 108 as explained in FIG. 1.

The geometrical transformation process is outlined in FIG. 2: The input video format must have a known geometrical equivalence. The most common case of geometrical transformation is occurs in an equirectangular video, where the mapping of the equirectangular video by the system to a spherical video geometry is known. See, for example, FIG. 3 which illustrates a mapping process into an equirectangular format 300 from left 302, front 304, right 306, and back 308. Other projections, such as cube maps and 180 degree projections, are also possible. Given a target geometry, the mathematical transformation from the target video input to a 3D space is achieved during the step of mapping the output video pixel to the 3D coordinates they should represent 218, and the translation from that 3D space to a new plane projection for the input geometry type 222.

Figure 3:
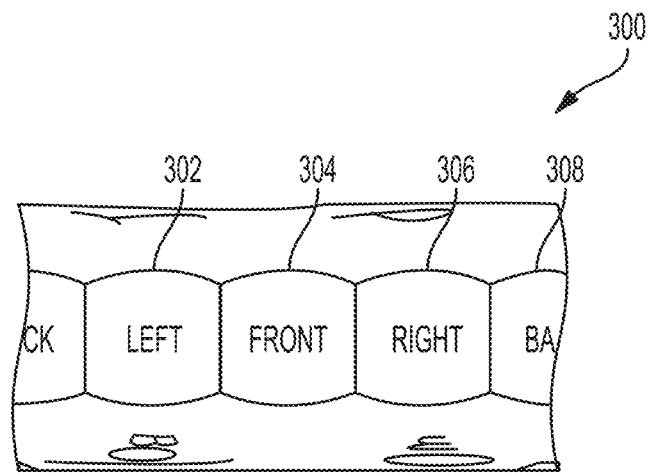
FIG. 3 illustrates how an image of a cube appears in an equirectangular format, one of the possible input formats for a backend VR processing flow.
Figure 4:
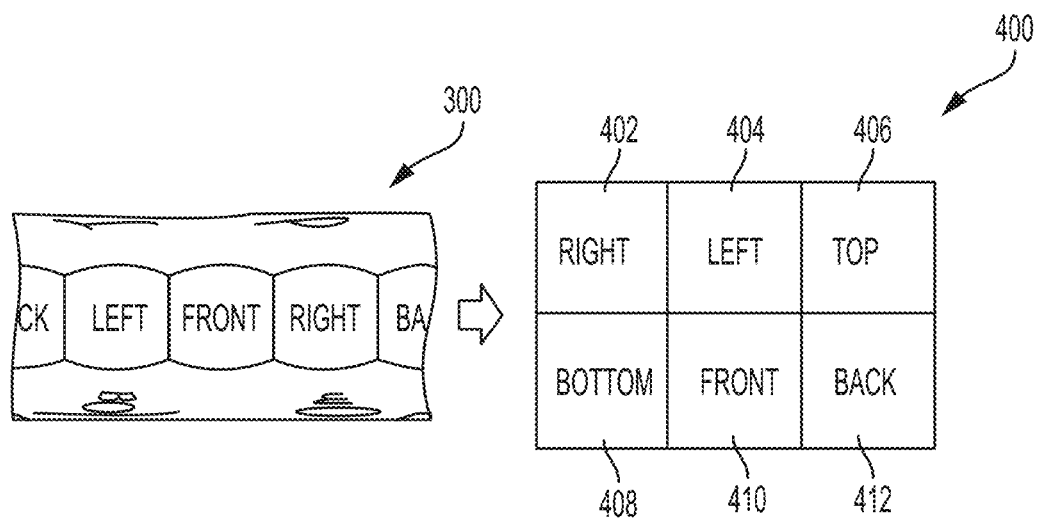
FIG. 4 illustrates the same cube illustrated in FIG. 3, shown in cube mapping, a precursor to a geometrical transformation of an equirectangular image.

FIG. 4 illustrates an example of cube mapping, which transforms an input of the equirectangular format 300, shown in FIG. 3, into a cube map 400 which has, for example, 6 squares including right 402, left 404, top 406, bottom 408, front 410 and back 412.

Since videos are discrete matrices and the 3D equivalence are real numbers, it is possible that the equivalence is not exact or that artifacts may occur due to discretization of the 3D space. For this reason, a submapping is done for each target pixel to determine if the effect of slight variations in the target 2D coordinates results in different source video 2D coordinates. If so, a weighted averaging approach can be captured as part the process of creating a transformation rule from the source pixels to the target pixels 224.

Additionally, it should be noted that a slight "padding" can be added by the system to the faces. Padding is performed to prevent artifacts when displaying the video in a 3D scenario and effectively duplicates some of the 3D coordinates around the edges of the faces. Padding is a preemptive step that can be used to ensure that the virtual space remains stable and continuous in the event of user head movements at the render time in the client devices. As will be appreciated by those skilled in the art, it is a well-known practice in 3-D graphics in general when using meshes that surround the user. The exact strength of padding is a parameter known and shared between backend and client player as metadata as part of the signaling information 112.

The allocation of greater pixels to areas of interest can be achieved anytime during the processes outlined in FIG. 2 by, for example, loading the transformation map 206 into the system and translating the pixels from input to output following the transformation rule 210. Any intervening steps, by, for example, having different face mappings, can also be performed as part of the transformation rule. For example, one of the faces can occupy a larger 2D space but be meant to represent a smaller 3D area, thus being able to capture further detail on that area. Another way to achieve this effect is moving the "origin point" of the transformation function, from the default position at the geometrical center of the 3D space to an "off-centered" origin, which achieves the effect of a smooth and gradual change in pixel allocation per mapped face in the "off-centered" axis.

Figure 5:
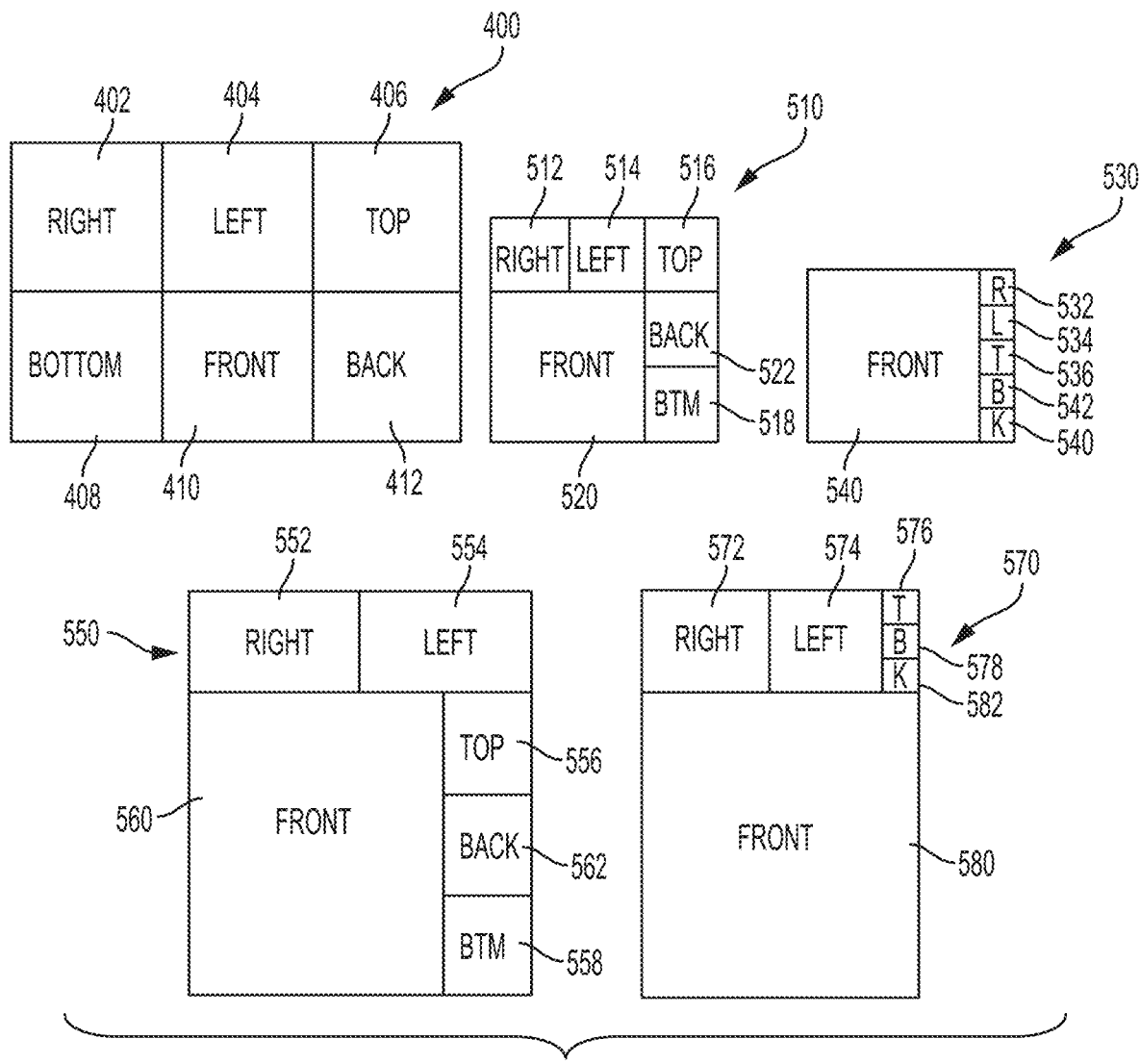
FIG. 5 illustrates examples of modifications of the cube map transformation to provide more resolution to select faces.

FIG. 5 illustrates two possible implementations of the disclosed approach. In a first configuration, the cube mapping is a cube map 400, as shown and described in FIG. 4. Slight variations can then be applied by the system to the cube mapping technique to, for example, allocate more 2D surface to one of the faces of the cube. In a first cube map variation 410, the right 512, left 514, and top 516 are positioned adjacent one another from left to right and have approximately the same size. Back 522, and bottom 518 are positioned top to bottom below the top 516, also having a similar size to the right 512, left 514 and top 516 which run from left to right along the top row. Front 520 is positioned to the left of the back 522 and bottom 518, and below the right 512 and left 514 and has a size about 4× any of the remaining squares. A corner of the front 520 touches a corner of the top 516, but no side of the front 520 touches any size of the top 516. The second cube map variation 530 has a right 532, left, 534, top 536, bottom 542 and back 540 positioned top to bottom along one side (the right side as shown), with the front 540 positioned adjacent the right 532, left, 534, top 536, bottom 542 and back 540. One side of the front 540 touches one side of each of the right 532, left, 534, top 536, bottom 542 and back 540. A third cube map variation 550 is illustrated with a right 552 and a left 554 positioned adjacent one another from left to right along a top edge, and a top 560, back 562, and bottom 558 along a side edge perpendicular to the top edge. A front 560 is positioned below the right 552 and a portion of the left 554 on one side and adjacent one side of the top 560, back 562 and bottom 558 on a second side perpendicular to the first side. A fourth cube map variation 570 is illustrated with a right 572 and a left 574 from left to right along a first side of a front 580. The top 576, bottom 578 and back 582 are positioned in order from top to bottom adjacent one side of the left 564. A side of the right 562, left 564 and back 572 are adjacent one side of the front 562. The remaining three sides of the front 580 do not touch any other sides of the right 572, left 574, top 576, bottom 578, or back 582.

Figure 19:
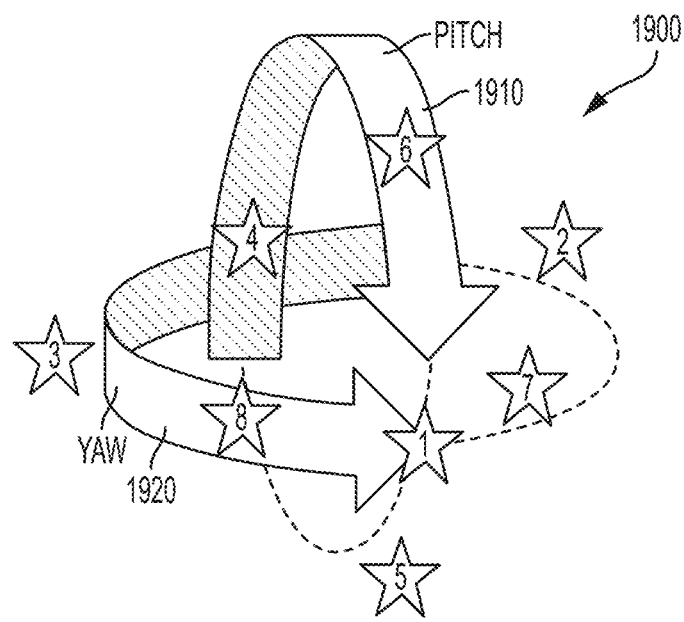
FIG. 19 illustrates multiple viewports by depicting an 8-viewport layout covering different yaw and pitch combinations.

The optimization at one subset of the 3-D space is done at the cost of having less 2D pixel space to represent a larger 3D area, thus resulting in a loss of quality in that part of the space. Therefore, an individual viewport optimized with this technique will provide a better resolution only within certain boundaries and not in the remaining space. This is why several optimized viewports are needed and why the method is designed to generate, signal and reproduce multiple viewports placed at different head positions and rotations. FIG. 19 illustrates a possible viewport layout 1900 with 8 view points, all in the same perspective, with a pitch 1910 about a first axis and a yaw 1920 about a second axis. The pitch 1910 includes, for example, points 1, 5, 4, and 6, while the yaw 1920 includes points 1, 7, 2, 3 and 8.

Pixel mapping can be a heavy computational task, and once the pixel mapping is calculated it remains valid as long as source and target videos retain the same geometrical meaning. For this reason, a caching mechanism is added to the method and performed by the system. As discussed above in FIG. 2, the transformation map cache 208 is checked by the system before attempting to compute the pixel mapping and loaded if successful in the step of loading the transformation map 206. Once the pixel mapping is computed, the pixel mapping is stored by the system in the cache during step of storing transformation rule set 216 for use in future transformation tasks. The transformation map cache 208 will be determined to be existing if the same geometrical and video characteristics are found in both the input videos and the output videos, including, for example:
 a. Resolution
 b. Geometry and projection types
 c. Face warping
 d. Face Padding
 e. Sub-mapping precision
 f. Perspective center Depending on the exact nature of the geometrical transformation applied by the system, a pixel density warp phenomenon might occur on the client side as a result of placing a flat face on a 3D environment.

Figure 6:
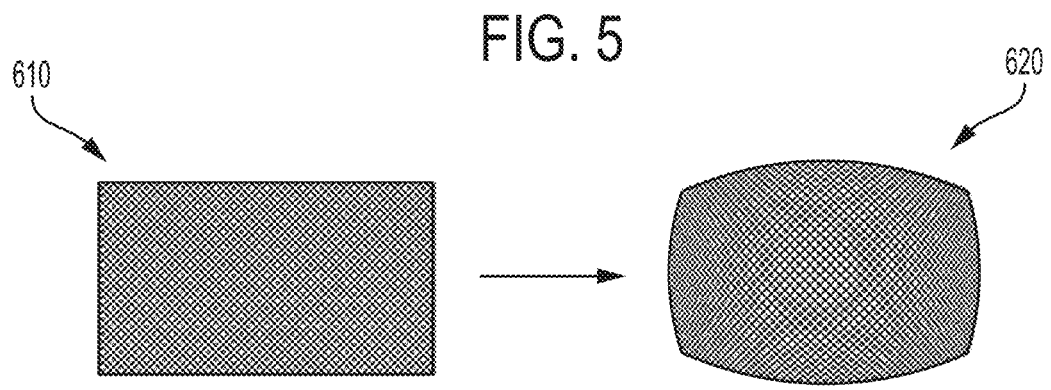
FIG. 6 illustrates pixel density phenomenon due to a projection of a face of a 3D environment on a cube map face.
Figure 7:
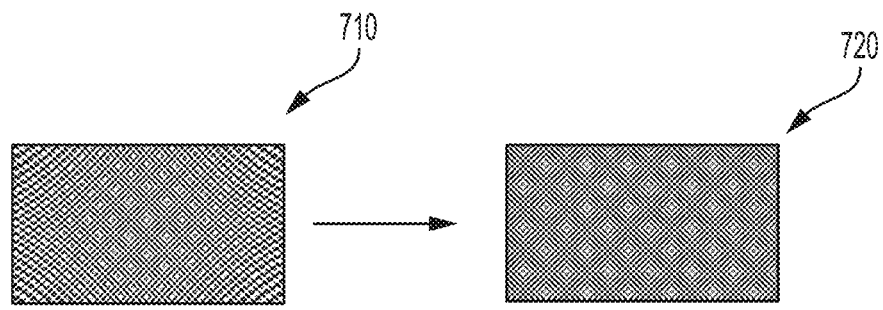
FIG. 7 illustrates an example of a cube map face pre-warping to achieve an equal pixel density.

FIG. 6 illustrates what the density warp phenomenon would do to a cube map face 610 once it is projected in a 3D environment 620: essentially, the pixels at the center of the view will occupy a larger angular space due to the fact that they are placed closer to the user virtual position, therefore providing lower resolution precisely in the section where greater resolution should be allocated. In order to offset the density warp, within each section of the geometrical transform, an inverse pixel allocation warp is added in the step of adjusting the 3D coordinates according to pre-warping strength 220 shown in FIG. 2. Adding the inverse pixel allocation warp effectively allocates more pixels by the system to the center of the transformation face which provides the greatest resolution. As illustrated in FIG. 7, as a first pixel density map 710 is transformed into a second pixel density map 720, the pixel allocation warp changes.

Figure 8:
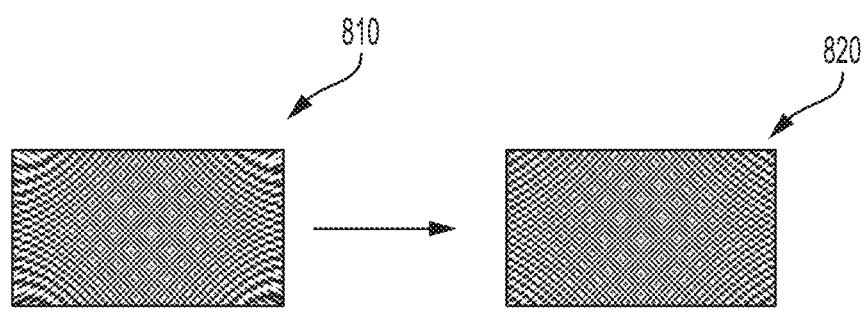
FIG. 8 illustrates pixel density inverse pre-warping tuned to achieve a greater density in the center area of the cube map face.

Greater granularity towards the exterior of each image frame will be provided at the cost of reducing the pixel density outside of the area, but with the desired effect of providing the maximum overall resolution at playback time on the client-side. Unlike similar approaches such as equiangular projections, the desired effect is not one of uniformity in pixel allocation, but one of providing the greatest pixel density in the center areas where the user attention is most likely to occur as illustrated in FIG. 8. The first pixel density map 810 illustrates greater pixel density in the center, with noticeably decreased pixel density at the exterior corners. The second pixel density map 820 illustrates greater pixel density in the center and decreased pixel density at the exterior corners, where the decreased pixel density at the corners is a higher exterior corner pixel density than illustrated in the first pixel density map 810.

After the frame with the desired geometrical transformation has been generated and warped, it can proceed to stamping. This procedure becomes necessary to allow the entire apparatus to remain agnostic to compression mechanisms and codecs, since it does not rely on proprietary metadata streams, tiling nor other codec-specific techniques. The stamping layout has been designed following these criteria:
 a. All the positions of the symbols are relative to the total width and height of the picture. This makes the stamp resilient to changes in the size and aspect ratio of the video (as long as the resolution and encoding quality don't destroy the symbols).
 b. The system should be future proof, meaning that it can be extended in the future to accommodate additional information, and that videos encoded with the current version of the stamp will work with newer versions without any video processing required.

Figure 9:
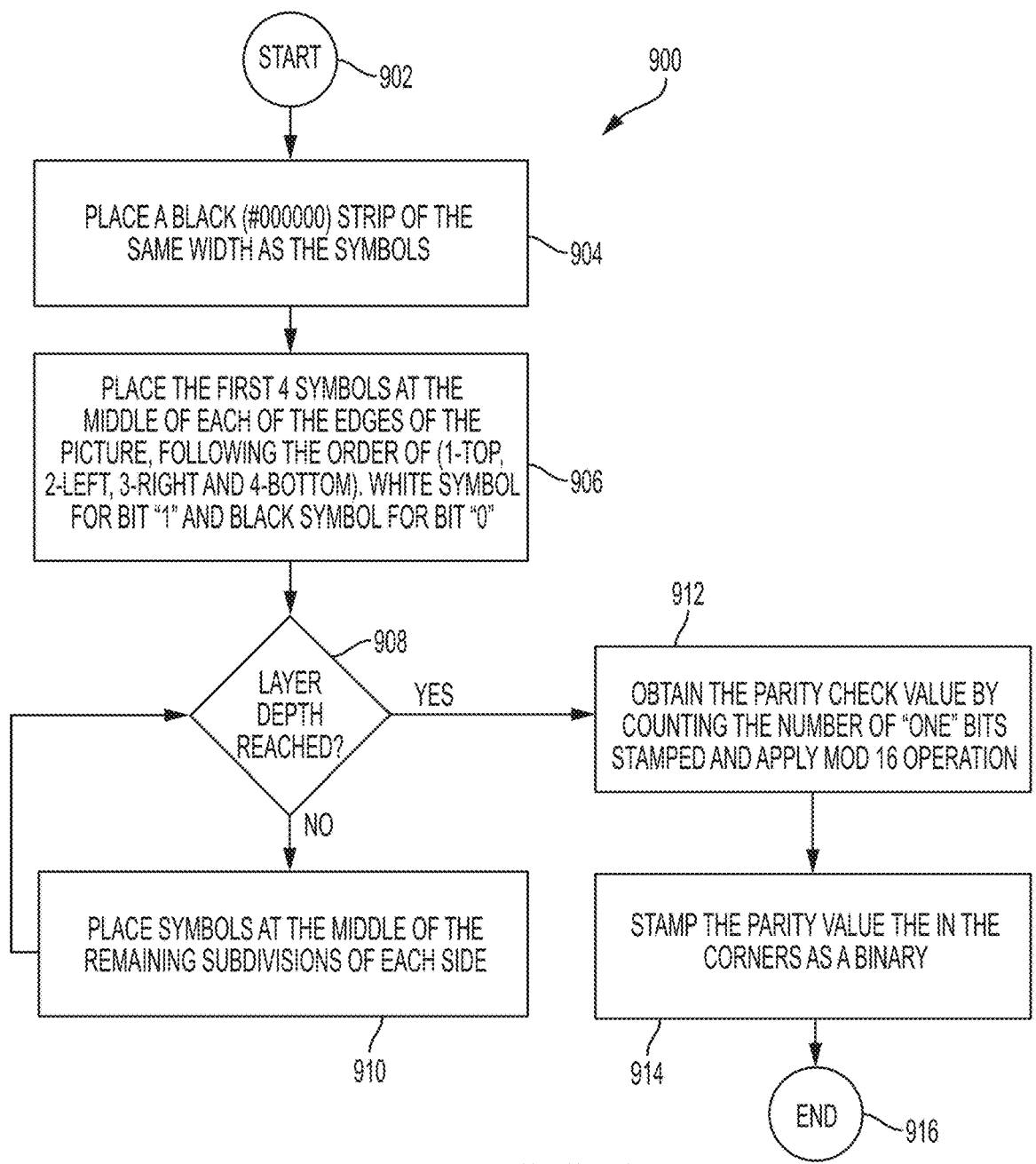
FIG. 9 illustrates a flow diagram for stamping a previously transformed frame.
Figure 15:
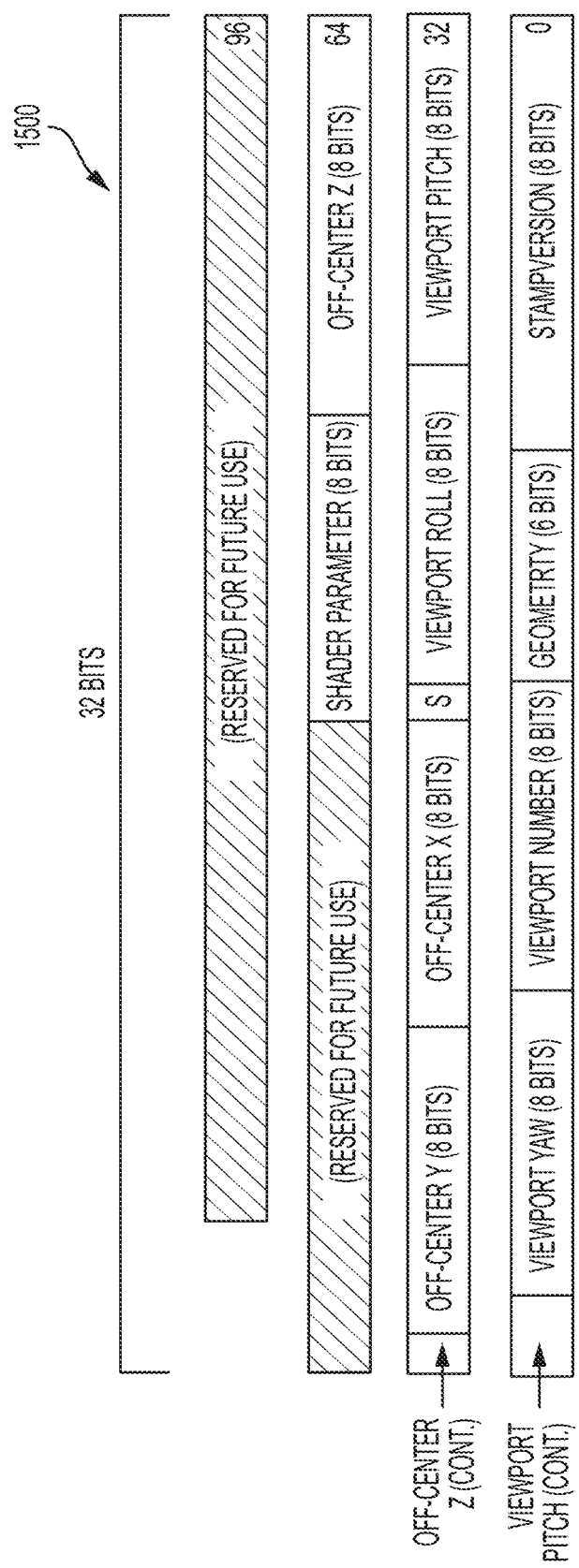
FIG. 15 illustrates a possible mapping of bits into meaningful values (e.g., bit-to-decimal mapping for a stamp bit configuration of a depth of 5) that must be shared between server and client side to encode and decode meaningful variables out of stamps.

The subsystem to generate signaling stamps of the process for stamping 900 is described in FIG. 9. This subsystem relies on the premise that there is a set of bits that need to be stamped in the frame, but makes no pre-defined assumptions with regards to the exact meaning of the bits. Consequently, there must be previously generated handshake mapping of the encoded bits (and later decoded in the player side), with meaningful values, and a mechanism to generate a bit stream out of these values before entering the stamping phase, such as the ones illustrated in FIG. 15.

Figure 10:
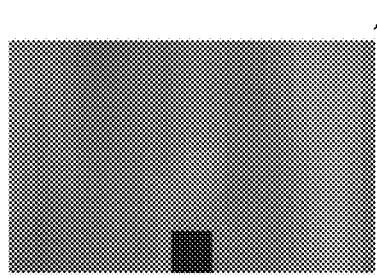
FIG. 10 and FIG. 11 illustrate stamps in a video frame representing a bit 0 with a black stamp in the video frame (FIG. 10) and bit 1 with a white stamp in the video frame (FIG. 11)
Figure 11:
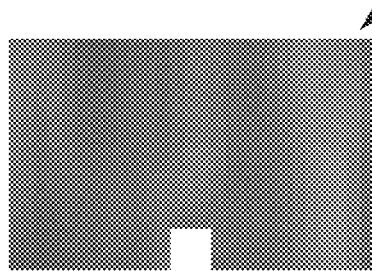
Figure 12:
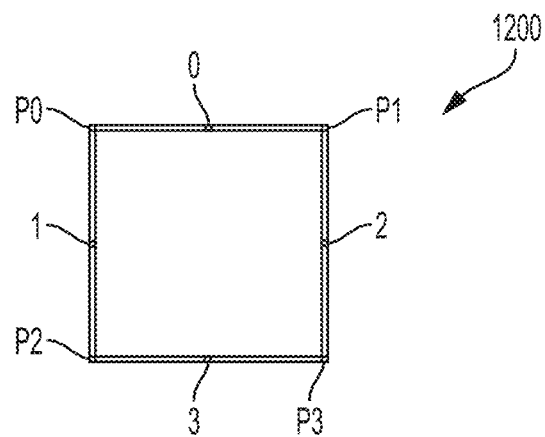
FIGS. 12-14 illustrate a layout of video stamp bit configurations with a growing layer depth from 1 (FIG. 12) to 3 (FIG. 14), illustrating a bit disposition and the growth in amount of bits that can be encoded.

Once the stamping process 900 starts 902, a black strip of the same width as the symbols is inserted 904 in the external border of the video to mark an area where stamps will be placed. Note that stamp will overlap with the frame, overwriting a small part of it, but the resolution of the frame remains the same, and the padding at the moment of generating the frame should be calibrated to avoid that the stripe overwrites meaningful frame information, done as part of creating a transformation rule from source pixels to target pixels 224 in FIG. 2. Next, the first 4 symbols are placed at the middle of each of the edges of the picture 906, stamping e.g. a white symbol for bit "1" (as illustrated in FIG. 11) or a black symbol for bit "0" (as illustrated in FIG. 10). The spaces in the 4 corners can be used for the 4 parity bits (achieved in the step of stamping the parity value in the corners 914 as binary shown in FIG. 9). The ordering of magnitude for each of the sides must be set, e.g.: 0—top, 1—left, 2—right, 3—bottom, where 0 is the least significant bit. The pre-set understanding of the direction of growth makes it possible to derive meaning from the stamps. The center of each symbol must be aligned with the center of the side of the 1-length frame 1200 and after the first pass of the algorithm, the frame stamps will have been placed as shown in FIG. 12. The center of each symbol aligns with the center of the side of the frame to allow correct stamp readings. The corners of the 1-length frame 1200 clockwise from top-left are: P0, P1, P3, and P2. A determination of whether more layers of depth are required 908 (NO), then symbols are placed in the middle of the remaining subdivisions of each side 910; the same operation is repeated for each of the corners, placing symbols at the middle of the remaining subdivisions of each side and following the same order of relevance for the sides. If a determination of whether more layers of depth are required (YES), then the system obtains a parity check value 912 by counting the number of "1" bits stamped and applies a mod 16 operation. The parity value is then stamped in the corners 914 as a binary and the process ends 916.

Figure 13:
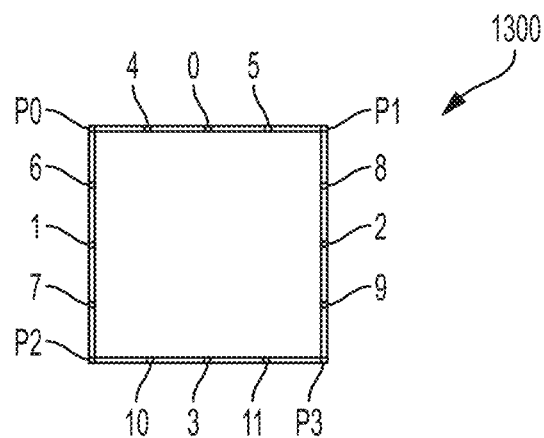
Figure 14:
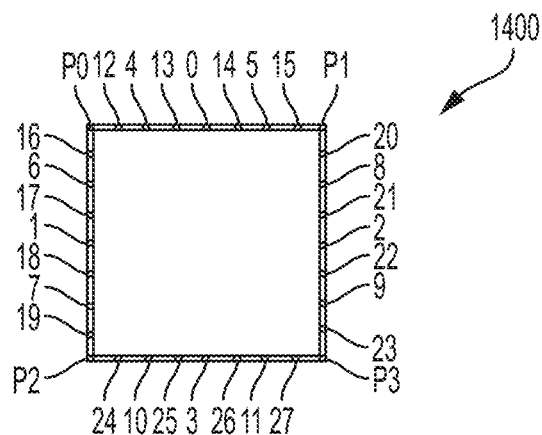

FIGS. 13-14 illustrate frame layouts of bits that the disclosed algorithm produces with lengths of 2-length frame 1300 and the 3-length frame 1400 respectively. In FIG. 13 and FIG. 14, the corners of the 2-length frame 1300 and the 3-length frame 1400 clockwise from top-left are: P0, P1, P3, and P2. The total number of symbols placed with a given number of layers (n) is defined by a geometric series:

$$b(n) = 4\sum_{k=1}^{n} 2^{k-1}$$

after which the process of obtaining the parity check value 912 is reached. Once all the bits have been placed in the stamps, a "parity" operation is performed by the system. Once the system obtains a parity check value 912 by counting the number of "1" bits stamped, the parity check value can be used on the client side for data integrity purposes. The parity check value can have a value between 0 and 15 which can be calculated by doing the modulo 16 operation on the number of bits set to "1" in the stamp.

$p$=(count of 1-bits)mod 16

The parity check value can be stamped in the frames in the corners 914 as a binary that were reserved previously. The ordering of those bits goes from left to right and then from top to bottom, where P0 (top-left corner) is the least significant bit and P3 (bottom-right corner) is the most significant bit, as illustrated in FIG. 12. Once this step is finished, the frame is completely stamped and ready to proceed to packaging.

Once the viewports are generated and stamped in the step of generating and stamping viewports according to the recipe 106, the content is encoded using a standard codec, such as H.264 or H.265, when the ABR renditions are generated 108 and stored in new file segments that follow the same structure and timing as the ones provided by the segmenter in the ingest as shown in FIG. 22.

FIG. 22 illustrates a VR video processing flow with parallel scalability structure for live video streaming. A video source 2210 is provided which is in communication with a segmenter 2212. The segmenter 2212 provides data to a segmenter database 2214. Data from the segmenter database 2214 is processed through a plurality of views, from ViewGen $xn_1$ 2220, ViewGen $xn_2$ 2222, ViewGen $xn_i$ 2224, and ViewGen $xn_v$ 2226, where $n_1$ is the number of view generators per viewport, and v is the number of viewports to generate. Resulting data from the ViewGen is compiled in a view generated database 2230. The data from the view generated database 2230 is processed via a plurality of transcoders, transcoder $xr_1$ 2242, transcoder $xr_2$ 2244, transcoder $xr_i$ 2246, and transcoder $xr_v$ 2248. The data resulting from the transcoders is put into a transcoder database 2250 and then processed via a packager 2252 and then an origin database 2254.

It is also possible to encode the content in several bitrates to produce ABR video, again using known standard transcoding techniques. All resulting files are then stored by the system in a new directory, following a name coding to preserve the synchronization. Such file structure will be used when the package viewport is set 110 to form the packets to be served by a commercially available packager, such as MPEG-DASH or HTTP live streaming (HLS streams). Such commercially available packager is an adaptive bitrate streaming technique that breaks the content into a sequence of small HTTP-based file segments. The commercially available packager will also provide the adequate manifest of the segments, that will include the stream collection of all viewports and bitrates, as in a standard case. It should be noted that, although it is possible to generate ABR renditions using the standard transcoding techniques, the embodiment here described expand this capability to allow to add different geometries in the same view direction, thus generating a subset of ABR renditions that are not simply composed of lower resolutions and bitrates, but also of different geometrical transformations and therefore different Field Of View (FOV) optimizations.

Since existing video encoding algorithms are generally more efficient when presented with low frequency pictures (e.g. areas with the same color encoded), a further optional improvement can be applied at the encoding stage for the case of stereoscopic videos by calculating a delta of each eye and encoding the result of such operation, instead of the original frames. In such encoding, one possible logic for calculating the encoded values would be:

Let L and R be the original values of color to be shown to the user in a scale from 0 to MAX, with EncodedL and EncodedR the values to be finally encoded in the video:

$$EncodedL = \frac{(L+R)}{2}$$

$$EncodedR = \frac{(L-R+\text{MAX})}{2}$$

Figure 28:
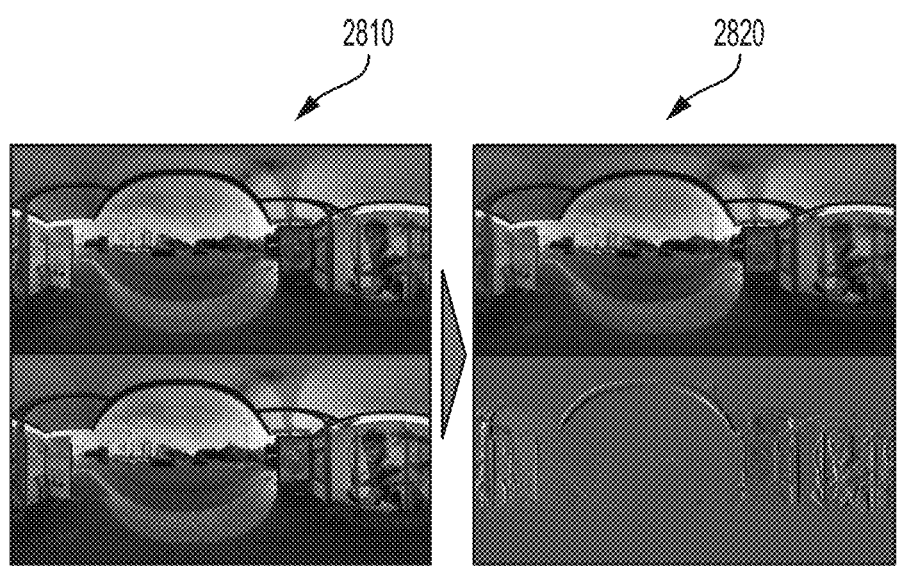
FIG. 28 illustrates an optional treatment the can be applied on stereoscopic video frames to improve codec efficiency.

A sample encoding output using this logic is shown in FIG. 28. The encoding uses the inherent redundancy of stereo video to its advantage: increasing the bitrate slightly in one half of the image 2810 and reducing the bitrate dramatically on the other half of the image 2820, thus reducing overall encoded bitrate of the entire video for a constant level of quality.

After the package viewport is set 110 as shown in FIG. 1, the ABR manifest is configurable to contain all viewports in the same list. Additional signaling may be needed by a client player in order to perform a mapping of which videos in the ABR manifest belong to which viewports in the 3D space. In order to keep the ABR manifest fully standard-compliant, the ABR manifest is not altered or augmented. Instead a complementary signaling file called a viewport map generated as illustrated in the example of the additional signaling information generated in JSON format shown in FIG. 18. The information about the mapping is parsed from the workflow recipe metadata outlined in the step of generating and stamping viewports according to the recipe 106 (FIG. 1) and contains the center of the optimized view in horizontal (yaw) and vertical (pitch) angles. There are a couple of additional aspects to take into consideration when building this signaling file.

a. It needs to be coordinated with the video manifest generation since identifiers from the video manifest are used as references in the signaling file.

b. Information about the specific way the viewport is configured in the 3D space (e.g. geometrical transformation, pixel warping, etc) is not sent as part of this signaling file but left only as part of the frame stamps.

c. Information about the spatial location of the viewport (position and rotation) is sent by both the signaling file and as part of each frame. The reason for this is that they are used in different moments of the playback sequence (which is covered in its own section in this document).

Figure 20:
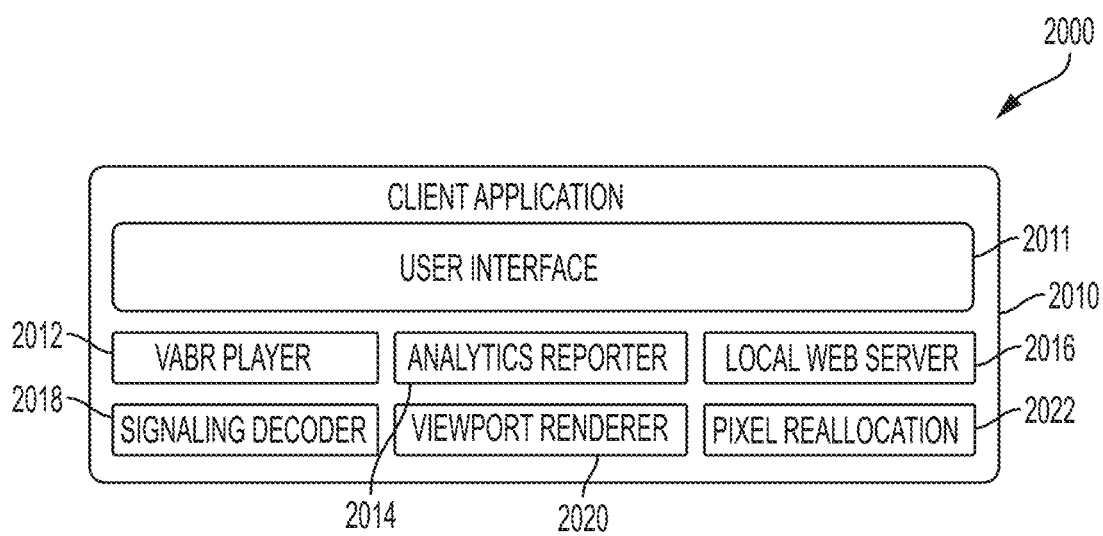
FIG. 20 illustrates client-side functional blocks.

In addition to the spatial mapping described above, the viewport map file also provides information about multiple periods during playback. As a default, the spatial mapping applies for the duration of the video, but it is also possible for the spatial mapping to define signaling sections for specific periods of time, delimited by the start and end time. FIG. 18 provides an example of the output format of this signal in JSON format, where the default case is signaled by not having any specific timeline as part of its description, and a specific period will be preceded by its lower and upper time bounds. Optionally the complementary signaling can also include a description of different points of view, which client-side is used to restrict video alternatives to include only those relevant to that perspective. Although some streaming protocols such as MPEG DASH also provide their own period implementations, this approach allows the capability to be detached from protocol implementation and makes the overall apparatus agnostic to the streaming protocol The next part of the description corresponds to the client-side reproduction of the VR video. FIG. 20 depicts the main functional components of the client-side application 2010 (user interface 2011, VABR player 2012, analytics reporter 2014, local web server 2016, signaling decoder 2018, viewport renderer 2020 and pixel reallocation 2022), which is designed to run on existing home and mobile devices.

Figure 23:
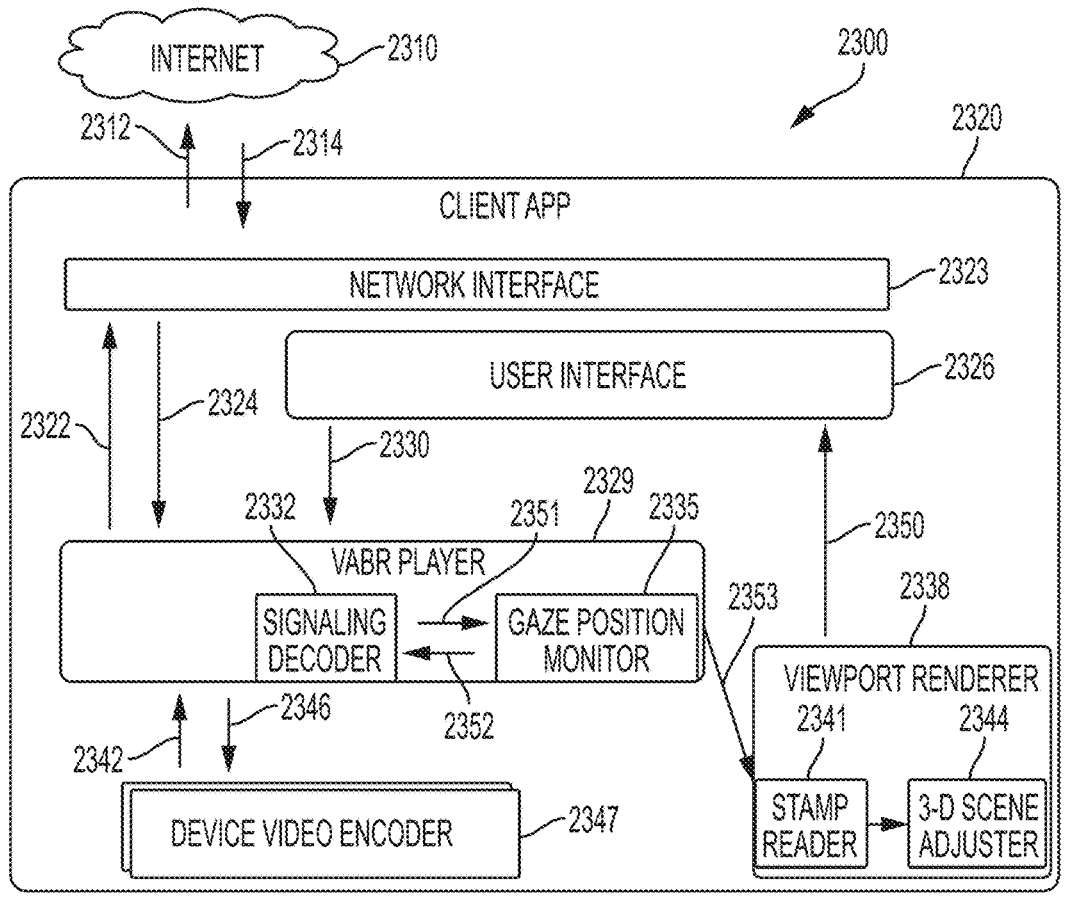
FIG. 23 illustrates a playback sequence of events on a client-side.

FIG. 23 covers the playback flow of the VR video 2300 given the disclosed method for generating viewports and signaling them. The internet 2310 is in communication with a client app 2320. The client app 2320 has a network interface 2323, a user interface 2326, a VABR player 2329 (which can include signaling decoder 2332 and gaze position monitor 2335), a device video decoder 2347, and a viewport rendered 2338 (which can include a stamp reader 2341, and a 3D scene adjuster 2344). Each component of the client app 2320 is in communication with and/or provides data between one or more sub-components of the client app 2320.

Prior to actual video playback, a user engages with the user interface 2326 and selects a video to play. The address of the selected video content is then sent to the Virtual Reality-Adaptive Bitrate player (referred as VABR Player 2329 in FIG. 23) during the UI-VABR communication process 2330, which in turn triggers the preparation of the 3D scene by the viewport rendered 2338 where the VR video will be displayed and initiates a remote request of the VR video signaling metadata. The remote request takes place between the network interface and VABR player and 2322 and between the network interface 2323 and internet 2310 during a first I-NI data transfer process 2312.

When the remote server responds with the signaling information between the internet 2310 and network interface 2323 during the second I-NI data transfer process 2314, the signaling information is immediately sent from the network interface 2323 to VABR player 2329 during a second NI-VABR data transfer process 2324 and parsed by the VABR player 2329 at the signaling decoder 2332. The signaling decoder 2332 reads signaling metadata to set up relevant viewports in the signaled positions and sends data from the signaling decoder 2332 and gaze position monitor 2335 during a first SD-GPM data transfer process 2351 to initialize gaze position monitor subcomponent. Once the gaze position monitor 2335 and signaling decoder 2332 are initialized, the VABR player 2329 is ready to request the first segment indicated by the signaling metadata. The signaling decoder 2332 and the gaze position monitor 2335 are configurable to communicate back and forth by sending data in a first direction and a second direction between the components as shown by first SD-GPM data transfer process 2351 and second SD-GPM data transfer process 2352.

FIG. 23 also covers the flow of VR video playback once the preparations stated previously are finished: The gaze position monitor continuously calculates the current and predicted head position using on one hand headset's interfaces and performing a prediction of the future head position, using a regression model that takes into consideration first and second derivatives of the head position and a set of offsetting variables to favor movements towards the equator of the field of view. This prediction is combined with the viewport configuration information previously set (at the gaze position monitor 2351) to compute the viewport most relevant for the user, defined as the one with the shortest angular distance to the predicted head position in the currently active point of view. This information is returned to the VABR player 2352 and used by the VABR player 2329 together with network conditions as parsed from the network interface (e.g. bandwidth, latency) and playback buffer conditions to determine which viewport to request next and at which bitrate. The request is then made from the VABR player 2329 to the network interface 2323 during a first NI-VABR data transfer process 2322 and then forwarded by the network interface 2323 to the internet 2310 during the first I-NI data transfer process 2312. The response for this request is received from the remote server between the network interface 2323 and internet 2310 during the first I-NI data transfer process 2312 and the network interface 2323 and VABR player 2329 during the second NI-VABR data transfer process 2324. It is important to note that, as long as the viewport is not changing, the VABR player 2329 will request the segments in sequence and store them in a sequential buffer. In the case of viewport change, a second chain of buffering and decoding is created by the VABR player 2329 in order to be able to handle two viewport decoding processes in parallel. Thus, if the result of the VABR player 2329 is a new viewport, a request between the VABR player 2329 and network interface 2323 during the first NI-VABR data transfer process 2322 will not follow the sequence of the existing viewport and instead attempt to load segments close to the playback position. The response from the request between the VABR player 2329 and network interface 2323 during the first NI-VABR data transfer process 2322, once it is received from the internet 2310 by the network interface 2323 during a second I-NI data transfer process 2314 will be sent to from the network interface 2323 to VABR player 2329 during the second NI-VABR data transfer process 2324 as a new buffer and decode chain. When data is transmitted to VABR player 2329 from device video encoder 2347 during a first VE-VABR communication process 2342, the VABR player 2329 sends the received frame to the device video encoder 2347. Note that in the case of a viewport change, there might optionally be more than one decode chain as a result of the multiple request-response chains. When data is transmitted by the system to VABR player 2329 from device video encoder 2347 during first VE-VABR communication process 2342, the device video encoder 2347 returns the decoded frame to the VABR player 2329 and the VABR player 2329 communicated with the viewport renderer 2338 during VABR-VR data transfer process 2353 to evaluate which frame to send for rendering. The decision of which frame to send for rendering is a mere pass-through of the frame when a single decode chain exists, but in the case of viewport change, the VABR player 2329 will send the frame corresponding to the new viewport only once it has reached sync with the pre-existing viewport. Otherwise the VABR player will send the frame from the old viewport. The decoded frame that has been determined to be the most relevant one for the user is sent to the 3D engine, where a stamp reader 2341 re-assembles the frame characteristics, e.g. the center of the viewport in angular coordinates, the center of the perspective point as Cartesian coordinates, an identifier for the exact geometrical transformation used in the viewport, the version of stamp method, etc. The information is encoded as a bit stream as explained above, and the exact meaning of the bit stream is subject to a bit-to-decimal transformation such as the one illustrated in FIG. 15.

The stamp reader component has the information about the exact mapping of decimals to bits according to the version read from the first significant bits of the stamp and proceeds with decoding the entire bit stream following that shared definition. Once these parameters are decoded in the 3D scene adjuster 2344, the scene adjuster subcomponent within the 3D engine takes the information by the stamp reader 2341 and makes any necessary adjustments to the playback 3D models to adjust exactly to the metadata stamped (e.g. rotate the scene, move the center of perspective, prepare the exact 3D geometry that matches the one the frame was encoded for, recompose the original frames with the inverse operations as those done during stereo video encoding etc.). Finally, once the adjustments to the 3D scene are done, the 3D engine is ready to display the frame to the user and the data is transmitted from the viewport renderer to user interface 2326 during VR-UI data transfer process 2350. As it becomes clear, this playback method allows to mix different methods of optimization on a frame-by-frame basis, accommodating for dynamic switching scenarios while also guaranteeing that the projection is performed appropriately so that the end user experience remains unaffected.

In the event of a viewport change, two approaches can be taken. The first approach is to sequentially place the video belonging to the new view port in the playback queue as part the transfer of data from the network interface to VABR player 1330, substituting the streaming chunks in the video buffer progressively as they become available. The second approach achieves an even faster viewport change can be achieved by having two device video decoders will be running in parallel, providing frames corresponding to different viewports when data is transferred from device video encoder 2347 to VABR player 2329 during first VE-VABR communication process 2342. These are two views of the same content that needs to be swapped when a viewport change is detected. This swap needs to be effectively done seamlessly to the user between the originating and the destination viewports. Only client devices with support for parallel video decoding can benefit from the second approach described here.

After the last frame of the originating viewport from the viewport rendered 2338 is presented to the user interface 2326 during data transfer 2350, the first frame of the destination viewport needs to be available. Those two consecutive frames of different viewports must correspond to consecutive frames in the original equirectangular video. Both streams of video frames obtained out of the device video decoder 2347 during a second VE-VABR data transfer 2346 and corresponding to the originating and destination viewports are continuously available to the stamp reader 2341. Stamp reader 2341 is able to continuously read the stamping information that includes enough data to sequence the video frames, and to determine the exact original matching frame in both viewports. Thus, during the data transfer 2354 between the stamp reader 2341 and the 3D scene adjuster 2344, both video frame streams are adjusted so that the sequence number of the originating viewport is (n−1), being (n) the sequence number of the first frame available on the destination viewport.

The apparatus is also configurable to support playback of unstamped videos. Supporting playback of unstamped videos does not impose the requirement that the content go through the stamping process and allows backward compatibility with previously existing content in equirectangular format. The viewport rendered 2338 is configurable to render the data without stamping, where parity bits are used to validate that the signaling metadata decoded is validated by making the same calculation of bit counting and comparing it to the read bits. If the parity test is passed, then the 3D scene adjuster 2344 acts as described above. If the parity test is not passed, the frame is considered equirectangular by default and the 3D scene adjuster 2344 takes the default behavior of projecting the frame as an equirectangular one.

The gaze position monitor 2335 is optionally configurable to perform a measurement and prediction of the future head position. FIG. 23 expands on the gaze position monitor 2335 to describe a method of data collection and treatment that results in the head position prediction. Once the selection of content is performed at the user interface 2326 and the manifest information arrives from the network interface 2323 to the VABR player 2329 via data transfer 2324, information about a playback state is collected by the VABR player 2329. The collected video playback information 2514 includes elements about the video itself and the collected visualization information 2516 which includes elements about VR-specific visualization aspects. An illustration of the data elements collected are illustrated in FIG. 24.

Figure 24:
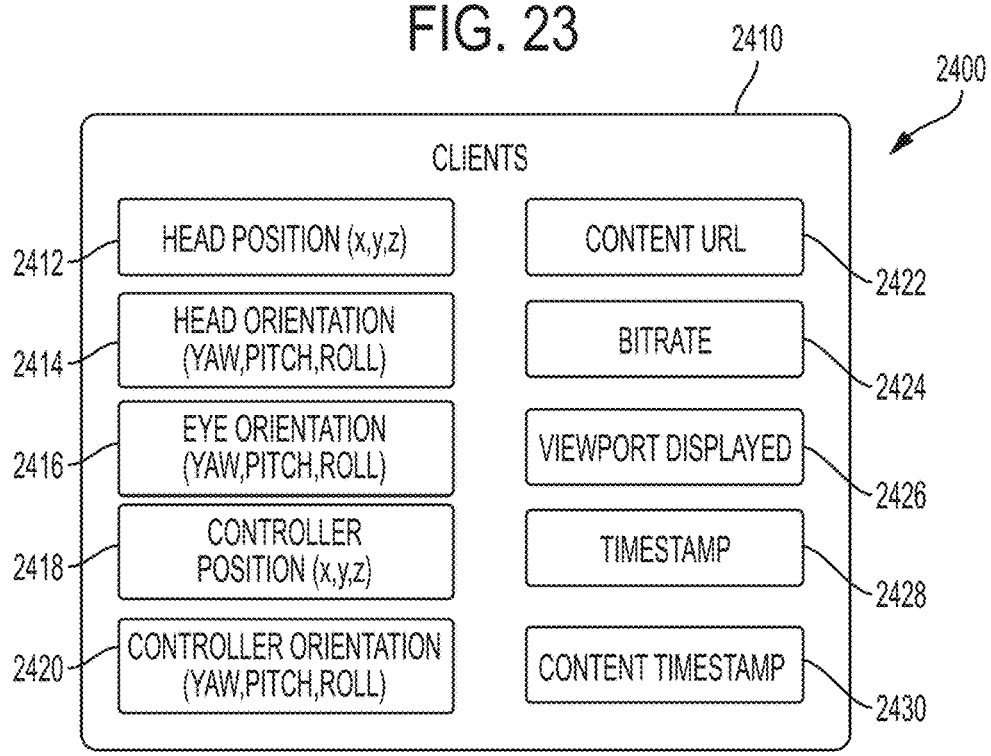
FIG. 24 illustrates an example of some of the data elements collected from the client to perform further analytics.

FIG. 24 illustrates a block diagram of data elements 2400 collected from the client. The client 2410 includes head position (x,y,z) 2412, head orientation (yaw, pitch, roll) 2414, eye orientation (yaw, pitch, roll) 2416, controller position (xyz) 2418, controller orientation (yaw, pitch, roll) 2420, content URL 2422, bitrate 2424, viewport displayed 2426, timestamp 2428, and content timestamp 2430.

Figure 25:
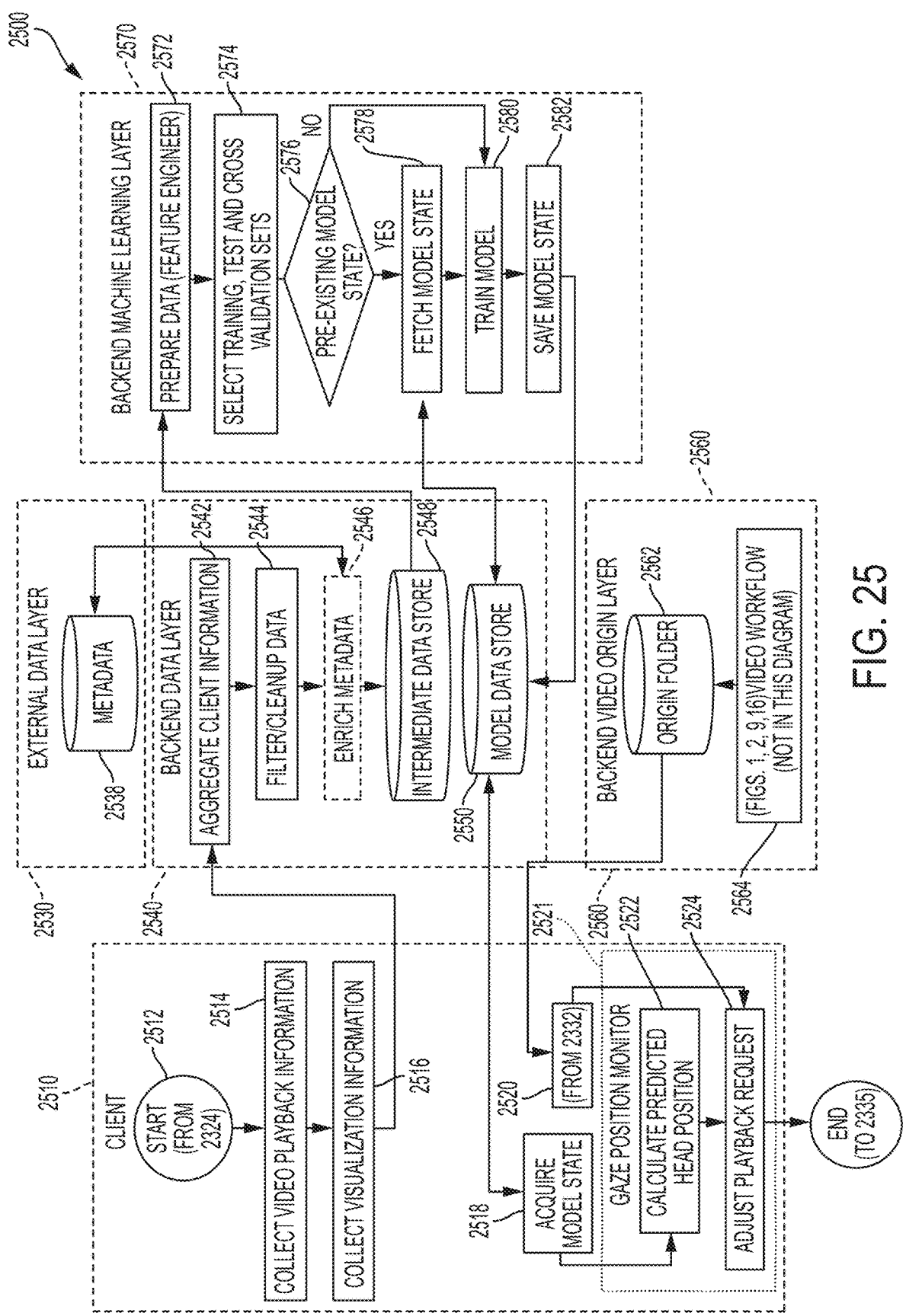
FIG. 25 illustrates a data processing flow chart for machine learning models utilized in VR video streaming.

FIG. 25 also illustrates a flow diagram of the treatment of the client data before it can be used for predictive modeling 2500: The client 2510 starts 2512 (from the data transfer 2324 between network interface 2323 and VABR player 2329 in FIG. 23). After starting, video playback information is collected 2514, followed by collecting visualization information 2516. From there the process proceeds to the backend data layer 2540 and aggregates client information 2542. Once client information is aggregated, a filter and data cleanup process 2544 is performed, after which metadata can optionally be enriched 2546. The result of either the filter clean-up or enrichment steps is provided to an intermediate data store 2548. Additionally, the result can be provided to external data layer 2530 and its metadata database 2538. The backend data layer 2540 can also include a model data store 2550 which is in communication with a model acquisition state 2518 process on the client 2510 and a fetch model state 2578 on a backend machine learning layer 2570.

The model acquisition state 2518 provides information to a gaze position monitor 2521 which calculates a predicted head position 2522 and then adjusts a playback request 2524. Once the playback request is adjusted, the process can end or return to the gaze position monitor 2335 in the VABR player 2329 shown in FIG. 23. Additionally, a backend video original layer includes an origin folder 2562 which provides information to origin folder process 2520 on the client 2510. The origin folder 2562 received video workflow 2564 which includes information from the processes illustrated in FIGS. 1, 2, 9 and 16.

The backend machine learning layer 2570 receives information from intermediate data storage 2584 and then prepares data via a feature engineer 2572. The output from the feature engineer 2572 is the provided to a process for selecting training, test and cross-validation sets 2574. Once the training, test and cross-validation sets are selected by the system, the process determines if there is a pre-existing model state 2576 exists. If there is a pre-existing model state (YES), then a model state is fetched 2578. The model state can be fetched from the model data store 2550 in the backend data layer 2540. Then the output provided to train a model 2580. If there is no pre-existing model state (NO), then the process proceeds directly to train a model 2580. Once the model train process is completed the model state is saved 2582 and the output is provided to the model data store 2550.

When the client information is aggregated 2542, the raw data from individual clients is aggregated by the backend data layer 2540, and a filtering and data cleanup process 2544 is applied to it, in order to make information about timestamps uniform, prevent fake data elements from arriving, tagging the data elements with additional information about their origin and processing and merging multiple individual client requests into larger data sets more suitable for data storage. During the video workflow 2564 (referring to FIGS. 1, 2, 9 and 16), a third-party content metadata provider can be contacted to expand on information about the content being watched by the user. This step is optional as models can work without this information. This processed data is then sent by the system to a data store for future usage in model training.

The backend machine learning layer also depicted in FIG. 25 can be set to run at regular intervals. Furthermore, the backend machine learning layer can also be configured to take the information produced by the backend data layer to perform model training. For that, the data is prepared via several feature engineering techniques in the feature engineer 2572. The data preparation in the feature engineer 2572 can vary depending on the type of raw data elements and can include discretization, normalization range bucketing, convolution, and compression, among others.

FIGS. 26A-B illustrate an exemplar of feature engineering steps that would be used to transform the stored data into elements that are ready to be processed through the machine learning model. With the data transformation completed, it is possible to use the transformed data in a machine learning training and validation pipeline:

FIG. 27 illustrates a schema of a data set that would enter the validation pipeline as illustrated in FIG. 25. The data set is split into training, test and cross-validation sets during the select training, test and cross-validation sets 2574 in FIG. 25. In the event that there is a prior state of the model trained by the system already, the model is fetched by the system to initialize the models during the fetch model state 2578. The data set is then used by the system to train the model to train the model 2580. The resulting model state is either added or updated in the corresponding data store to save the model state 2582.

The model weights and parameters generated during the trained model 2580 process and stored during the save model state 2582 are meant to be utilized by one or more clients 2510, as the model weights and parameters which are processed and stored contain the weights that will be employed to calibrate the model to predict the future head position. The model state relevant to that playback session is retrieved from the remote data store at the acquire model stage 2518. The current head position of the user is then obtained by the system from the headset and added as an input for the estimation model to produce an estimation of what the future head position will be in a given timeframe when the predicted head position 2522 is calculated (the length of that prediction being a configurable parameter of the gaze position monitor 2521). That head position prediction is used in combination with parsed signaling metadata which the signaling decoder 2332 (FIG. 23) uses to calculate the viewport with the closest angular distance to the predicted head position. Once the viewpoint calculation is completed, a playback process continues at the gaze position monitor 2335 and then proceeds as described above.

The model training pipeline in the backend learning layer 2500 is configurable to accommodate various levels of granularity, which are used depending on the number of training samples available:

Level 0—Single master model
Level 1—Models specific to the headset type
Level 2—Models specific to the user account
Level 3—Models specific to the content type
Level 4—Models specific to both headset and user
Level 5—Models specific to both headset and content type
Level 6—Models specific to both headset, content type and user These models are fetched in separate pipelines as part of the fetch model state 2578, trained as part of the training model 2580, and independent model states are stored as part of the save model state 2582, but only one of the saved models is given to the client 2510 as part of the model acquisition state 2518. The basic logic used by the system to determine which model to provide is: choose the highest qualifying model level: where a model level is considered as qualifying if the number of training samples used to train it is above a specified minimum sample threshold.

The systems and methods according to aspects of the disclosed subject matter may utilize a variety of computer and computing systems, communications devices, networks and/or digital/logic devices for operation. Each may, in turn, be configurable to utilize a suitable computing device that can be manufactured with, loaded with and/or fetch from some storage device, and then execute, instructions that cause the computing device to perform a method according to aspects of the disclosed subject matter. Certain parts of this disclosure may be activated or deactivated according to the computing capabilities of each specific device.

A computing device can include without limitation a mobile user device such as a mobile phone, a smartphone and a cellular phone, a personal digital assistant ("PDA"), a tablet, a laptop, a dedicated Virtual Reality Head-Mounted Display (HMD), and the like. In at least some configurations, a user can execute a browser application over a network, such as the Internet, to view and interact with digital content, such as screen displays. A display includes, for example, an interface that allows a visual presentation of data from a computing device. Access could be over or partially over other forms of computing and/or communications networks. A user may access a web browser, e.g., to provide access to applications and data and other content located on a website or a webpage of a website.

A suitable computing device may include a processor to perform logic and other computing operations, e.g., a stand-alone computer processing unit ("CPU"), or hard wired logic as in a microcontroller, or a combination of both, and may execute instructions according to its operating system and the instructions to perform the steps of the method, or elements of the process. The user's computing device may be part of a network of computing devices and the methods of the disclosed subject matter may be performed by different computing devices associated with the network, perhaps in different physical locations, cooperating or otherwise interacting to perform a disclosed method. For example, a user's portable computing device may run an app alone or in conjunction with a remote computing device, such as a server on the Internet. For purposes of the present application, the term "computing device" includes any and all of the above discussed logic circuitry, communications devices and digital processing capabilities or combinations of these.

Certain embodiments of the disclosed subject matter may be described for illustrative purposes as steps of a method that may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at sometimes be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method comprising:
   receiving a virtual reality video input having a source image and at least an 8 k resolution;
   processing the received virtual reality video input into a viewport comprising a geometric transformation of the input image wherein the geometric transformation generates a remapped image at a first target projection from a first head position of an entire panoramic image of the virtual reality video input for a first adaptive bit rate target wherein a greater resolution is allocated to a section of the remapped image and a lower resolution is allocated to the remaining remapped image, and further wherein the remapped image is processed to optimize transmission of a stereoscopic video by replacing a value of each pixel in one of the eye views of a stereoscopic view with an average of a value of pixels in a coordinate of both eye views of the stereoscopic image and replacing the value of each pixel in a single eye view of the stereoscopic view with a normalized difference of the value of the pixels in an equivalent coordinate in both eye views of the source stereoscopic image;
   repeating the step of processing of the virtual reality video input into a second viewport from a second head position at a second adaptive bit rate target;
   generating a first signaling information for all processed viewports wherein the first signaling information is external metadata; and
   generating a second signaling information from the viewport wherein the second signaling information is embedded metadata.

2. The method of claim 1 further comprising the step of playing the processed virtual reality video.

3. The method of claim 1 further comprising the step of embedding the first signaling information and the second signaling information into a frame space in one or more video frames.

4. The method of claim 1 further comprising the step of processing the received virtual reality video input real-time.

5. The method of claim 1 further comprising the steps of communicating with a gaze position monitor to fetch an appropriate viewport, and parsing an embedded frame metadata at a client side for playback.

6. The method of claim 5 further comprising the step of calculating a predicted head position for a user and adjusting a playback request in response to the predicted head position.

7. The method of claim 1 further comprising the steps of sending data to a machine learning engine, fetching a machine learning model state to determine a head position prediction, training the machine learning model state using aggregated data from multiple sources, and saving the model state for later access by a client device.

8. A streaming server comprising:
a memory;
a controller configured to
receive a virtual reality video input having a source image and at least an 8 k resolution;
process the virtual reality video input into a viewport comprising a geometric transformation of the input image wherein the geometric transformation generates a remapped image at a first target projection from a first head position of an entire panoramic image of the virtual reality video input for a first adaptive bit rate target wherein a greater resolution is allocated to a section of the remapped image and a lower resolution is allocated to the remaining remapped image, and further wherein the remapped image is processed to optimize transmission of a stereoscopic vide by replacing a value of each pixel in one of the eye view of a stereoscopic view with an average of a value of pixels in a coordinate of both eye views of the stereoscopic image and replacing the value of each pixel in a single eye view of the stereoscopic view with a normalized difference of the value of the pixels in an equivalent coordinate in both eye views of the source stereoscopic image;
re-process the virtual reality video input into a second viewport from a second head position at a second adaptive bit rate target,
generate signaling information for all processed viewports, both as external metadata and as embedded metadata in the video frames, and
deliver the processed virtual reality video input to a standard streaming origin folder for device streaming.

9. The server of claim 8 wherein the controller is further configured to segment the input video as a first process, set-up the processing tasks from a segmented source.

10. The server of claim 8 wherein the controller is further configured to detect pending processing tasks wherein each process is assigned to a single file and a parallel process occurs for files having different names which have not been processed.

11. A method comprising:
receiving a virtual reality video input having a source image and with a resolution of at least 8 k resolution having two or more video frames into a system;
processing the received virtual reality video input into a viewport comprising a geometric transformation of the input image wherein the geometric transformation generates a remapped image at a first target projection from a first head position of an entire panoramic image of the virtual reality video input for a first adaptive bit rate target wherein a greater resolution is allocated to a section of the remapped image and a lower resolution is allocated to the remaining remapped image, and further wherein the remapped image is processed to optimize transmission of a stereoscopic video by replacing a value of each pixel in one of the eye views of a stereoscopic view with an average of a value of pixels in a coordinate of both eye views of the stereoscopic image and replacing the value of each pixel in a single eye view of the stereoscopic view with a normalized difference of the value of the pixels in an equivalent coordinate in both eye views of the source stereoscopic image;
repeating the step of processing of the virtual reality video input into a viewport for each frame of the virtual reality video input at a second adaptive bit rate target;
generating a first signaling information for all processed viewports as external metadata and a second signaling information as embedded metadata in the two or more video frames; and
delivering a processed video output from the system to a client device wherein each frame of the processed video output comprises a low density pixel region and a high density pixel region.

12. The method of claim 11 further comprising the step of adding embedded metadata into the video frames and generating additional signaling information of viewports.

13. A method comprising:
receiving a video input having a source image and at least an 8 k resolution;
processing the received video input into a viewport comprising a geometric transformation of the input image wherein the geometric transformation generates a remapped image at a first target projection from a first head position of an entire panoramic image of the video input for a first adaptive bit rate target wherein a greater resolution is allocated to a section of the remapped image and a lower resolution is allocated to the remaining remapped image;
repeating the step of processing of the video input into a second viewport from a second head position at a second adaptive bit rate target;
generating a first signaling information for all processed viewports wherein the first signaling information is external metadata;
generating a second signaling information from the viewport wherein the second signaling information is embedded metadata; and
sending data to a machine learning engine, fetching a machine learning model state to determine a head position prediction, training the machine learning model state using aggregated data from multiple sources, and saving the model state for later access by a client device.

14. The method of claim 13 further comprising the step of playing the processed virtual reality video.

15. The method of claim 13 further comprising the step of embedding the first signaling information and the second signaling information into a frame space in one or more video frames.

16. The method of claim 13 further comprising the step of processing the received virtual reality video input real-time.

17. The method of claim 13 further comprising the steps of communicating with a gaze position monitor to fetch an appropriate viewport, and parsing an embedded frame metadata at a client side for playback.

18. The method of claim 17 further comprising the step of calculating a predicted head position for a user and adjusting a playback request in response to the predicted head position.

19. The method of claim 13 wherein the adaptive bit rate rendition comprises a frame treatment process to optimize transmission of a stereoscopic video by replacing a value of each pixel in one of the eye views of a stereoscopic view with an average of a value of pixels in a coordinate of both eye views of the stereoscopic image and replacing the value of each pixel in a single eye view of the stereoscopic view with a normalized difference of the value of the pixels in an equivalent coordinate in both eye views of the source stereoscopic image.

20. A streaming server comprising:
a memory;
a controller configured to
receive a video input having a source image and at least an 8 k resolution;
process the video input into a viewport comprising a geometric transformation of the input image wherein the geometric transformation generates a remapped image at a first target projection from a first head position of an entire panoramic image of the video input for a first adaptive bit rate target wherein a greater resolution is allocated to a section of the remapped image and a lower resolution is allocated to the remaining remapped image;
re-process the video input into a second viewport from a second head position at a second adaptive bit rate target,
generate signaling information for all processed viewports, both as external metadata and as embedded metadata in the video frames,
deliver the processed video input to a standard streaming origin folder for device streaming; and
send data to a machine learning engine, fetching a machine learning model state to determine a head position prediction, training the machine learning model state using aggregated data from multiple sources, and saving the model state for later access by a client device.

21. The server of claim 20 wherein the controller is further configured to segment the input video as a first process, set-up the processing tasks from a segmented source.

22. The server of claim 20 wherein the controller is further configured to detect pending processing tasks wherein each process is assigned to a single file and a parallel process occurs for files having different names which have not been processed.

23. The server of claim 20, wherein the controller is further configured to generate adaptive bit rate renditions comprising a frame treatment process to optimize transmission of a stereoscopic vide by replacing a value of each pixel in one of the eye view of a stereoscopic view with an average of a value of pixels in a coordinate of both eye views of the stereoscopic image and replacing the value of each pixel in a single eye view of the stereoscopic view with a normalized difference of the value of the pixels in an equivalent coordinate in both eye views of the source stereoscopic image.

* * * * *